United States Patent
Patil et al.

(10) Patent No.: US 10,836,234 B2
(45) Date of Patent: Nov. 17, 2020

(54) ACTUATION OF HVAC SYSTEMS IN ANTICIPATION OF A USER'S THERMAL NEEDS BASED ON REMOTE SMART DEVICE DATA

(71) Applicant: Ford Global Technologies, LLC, Dearborn, MI (US)

(72) Inventors: Sunil Patil, Troy, MI (US); David Michael Herman, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 16/193,586

(22) Filed: Nov. 16, 2018

(65) Prior Publication Data

US 2020/0156435 A1 May 21, 2020

(51) Int. Cl.
*B60H 1/00* (2006.01)
(52) U.S. Cl.
CPC ................ *B60H 1/00742* (2013.01)
(58) Field of Classification Search
CPC ................................. B60H 1/00742
See application file for complete search history.

(56) References Cited

U.S. PATENT DOCUMENTS

| 2008/0114502 | A1* | 5/2008 | Breed | ................ | B60C 23/0449 |
| | | | | | 701/2 |
| 2011/0166711 | A1* | 7/2011 | Markowitz | ........ | B60H 1/00885 |
| | | | | | 700/278 |
| 2012/0234930 | A1 | 9/2012 | Wijaya | | |
| 2015/0161834 | A1 | 6/2015 | Spahl et al. | | |
| 2016/0244010 | A1 | 8/2016 | Tseng et al. | | |
| 2017/0129335 | A1* | 5/2017 | Lu | .......................... | G06F 19/324 |
| 2017/0282685 | A1 | 10/2017 | Bader et al. | | |

(Continued)

FOREIGN PATENT DOCUMENTS

| EP | 0476692 A2 | 3/1992 |
| WO | 2018134511 A1 | 7/2018 |

OTHER PUBLICATIONS

Estimating Clothing Thermal Insulation Using an Infrared Camera, Jeong-Hoon Lee et al. (Year: 2016).*

(Continued)

*Primary Examiner* — Peter D Nolan
*Assistant Examiner* — Ashley L Redhead, Jr.
(74) *Attorney, Agent, or Firm* — David Coppiellie; Price Heneveld LLP

(57) ABSTRACT

A method of changing the climate of the interior of a vehicle comprises: accepting data from an electronic device of an anticipated passenger of a vehicle, the vehicle having an interior with a climate, and data from the vehicle; analyzing both the data from the electronic device and the vehicle pursuant to a thermal comfort model to determine whether the climate would be comfortable to the anticipated passenger; if the climate would not be comfortable, then controlling one or more systems of the vehicle to change the climate until the climate would be comfortable to the anticipated passenger pursuant to the thermal comfort model before the anticipated passenger enters the interior of the vehicle; and picking up the anticipated passenger. Analyzing the data from the electronic device includes estimating the amount of chemical energy that the anticipated passenger is transforming into heat.

20 Claims, 8 Drawing Sheets

(56) References Cited

U.S. PATENT DOCUMENTS

| | | | |
|---|---|---|---|
| 2018/0208017 A1* | 7/2018 | Hernandez | B60K 35/00 |
| 2018/0266834 A1* | 9/2018 | Cronin | G01C 21/3415 |
| 2018/0345753 A1* | 12/2018 | Beloe | B60H 1/00964 |

OTHER PUBLICATIONS

Kwapisz, Jennifer R. et al., "Activity Recognition using Cell Phone Accelerometers," SIGKDD Explorations, vol. 12, Issue 2, pp. 74-82 (Jul. 25, 2010).

Su, Xing et al., "Activity Recognition with Smartphone Sensors," Tsinghua Science and Technology, ISSN 1007-0214 Feb. 2011 pp. 235-249, vol. 19, No. 3 (Jun. 2014).

Hernandez, Javier et al., "BioPhone: Physiology Monitoring from Peripheral Smartphone Motions," Institute of Electrical and Electronics Engineers (IEEE), pp. 7180-7183 (2015).

Mansoubi, Maedeh et al., "Energy expenditure during common sitting and standing tasks: examining the 1.5 MET definition of sedentary behaviour," BMC Public Health, 15:516, 8 pages (2015).

Fujinami, Kaori, "On-Body Smartphone Localization with an Accelerometer," Information, Molecular Diversity Preservation International (MDPI), (7, 21), 23 pages (2016).

Lee, Jeong-Hoon et al., "Estimating Clothing Thermal Insulation Using an Infrared Camera," Sensors, Molecular Diversity Preservation International (MDPI), (16, 341), 16 pages (2016).

Yamamoto, Shuhei et al., "The simple method for predicting metabolic equivalents using heart rate in patients with cardiovascular disease," IJC Heart & Vasculature 19, pp. 88-89 (2018).

Opensignal, Inc., "WeatherSignal for Android," https://opensignal.com/reports/battery-temperature-weather/, 8 pages (2018).

* cited by examiner (a) Walking (b) Jogging (c) Ascending Stairs (d) Decending Stairs (e) Sitting (f) Standing

ACTUATION OF HVAC SYSTEMS IN ANTICIPATION OF A USER'S THERMAL NEEDS BASED ON REMOTE SMART DEVICE DATA

FIELD OF THE INVENTION

The present invention generally relates to control of a climate of an interior of a vehicle.

BACKGROUND OF THE INVENTION

A person can utilize an electronic device such as a smartphone to hail a vehicle. The person can select a location where the vehicle and the person will meet to allow the person to enter the vehicle and become a passenger. The vehicle then transports the person to a destination that the person has chosen. However, the interior of the vehicle is sometimes too hot or too cold to the person when the person becomes a passenger. That causes the person to experience discomfort while the vehicle is transporting the person to the destination.

SUMMARY OF THE INVENTION

According to a first aspect of the present invention, a method of changing the climate of the interior of a vehicle comprises: accepting data from an electronic device of an anticipated passenger of a vehicle, the vehicle having an interior with a climate, and data from the vehicle; analyzing both the data from the electronic device and the vehicle pursuant to a thermal comfort model to determine whether the climate would be comfortable to the anticipated passenger; if the climate would not be comfortable, then controlling one or more systems of the vehicle to change the climate until the climate would be comfortable to the anticipated passenger pursuant to the thermal comfort model before the anticipated passenger enters the interior of the vehicle; and picking up the anticipated passenger.

Embodiments of the first aspect of the invention can include any one or a combination of the following features:
  accepting data from an electronic device of a second anticipated passenger of the vehicle, the vehicle having an interior with a first zone and a second zone, each having a climate, and data from the vehicle;
  analyzing both the data from the electronic device of the anticipated passenger and the vehicle pursuant to the thermal comfort model to determine whether the climate at the first zone would be comfortable to the anticipated passenger;
  analyzing both the data from the electronic device of the second anticipated passenger and the vehicle pursuant to a thermal comfort model to determine whether the climate at the second zone would be comfortable to the second anticipated passenger;
  if the climate at the first zone would not be comfortable to the anticipated passenger, then controlling one or more systems of the vehicle to change the climate of the first zone until the climate would be comfortable to the anticipated passenger pursuant to the thermal comfort model before the anticipated passenger enters the interior of the vehicle;
  if the climate at the second zone would not be comfortable to the second anticipated passenger, then controlling one or more systems of the vehicle to change the climate of the second zone until the climate would be comfortable to the second anticipated passenger pursuant to the thermal comfort model before the second anticipated passenger enters the interior of the vehicle;
  picking up the second anticipated passenger;
  analyzing the data from the electronic device includes estimating the amount of chemical energy that the anticipated passenger is transforming into heat;
  analyzing both the data from the electronic device and the vehicle includes estimating the amount of heat that the anticipated passenger would be losing if the anticipated passenger were in the interior of the vehicle and subject to the climate;
  the thermal comfort model estimates heat that the anticipated passenger would be losing by estimating at least heat that the anticipated passenger would be losing through evaporation during breathing, through convection during breathing, through convection and radiation at the body surface, and through evaporation of perspiration;
  the one or more systems of the vehicle to be controlled to change the climate until the climate would be comfortable to the anticipated passenger pursuant to the thermal comfort model include a heater, a vent, an air conditioner to change the temperature of the air of the interior, and a temperature control device to change the temperature of a seat of the vehicle;
  the one or more systems of the vehicle to be controlled to change the climate until the climate would be comfortable to the anticipated passenger pursuant to the thermal comfort model include an air blower to alter the velocity of the air in the interior;
  the amount of heat that the anticipated passenger would be losing if the anticipated passenger were in the interior of the vehicle and subject to the climate is estimated, at least in part, from the temperature of the air of the interior;
  the amount of heat that the anticipated passenger would be losing if the anticipated passenger were in the interior of the vehicle and subject to the climate is estimated, at least in part, from the relative humidity of the air of the interior;
  the amount of heat that the anticipated passenger would be losing if the anticipated passenger were in the interior of the vehicle and subject to the climate is estimated, at least in part, from a mean radiant temperature of the interior of the vehicle derived from a difference in temperature between the temperature of the air of the interior and the temperature of the air of the exterior;
  the anticipated passenger hailing the vehicle with the electronic device;
  the vehicle includes an air blower to blow air into the interior of the vehicle, the air blower configured to blow air at different levels of power;
  the amount of heat that the anticipated passenger would be losing if the anticipated passenger were in the interior of the vehicle and subject to the climate is estimated, at least in part from, the level of power at which the air blower is blowing air into the interior;
  the electronic device includes an accelerometer that generates acceleration data;
  the amount of chemical energy that the anticipated passenger is transforming into heat is estimated, at least in part, from the acceleration data;
  the electronic device includes a global positioning system receiver, which generates location as a function of time data;

the amount of chemical energy that the anticipated passenger is transforming into heat is estimated, at least in part, from the location as a function of time data by calculating the speed of the anticipated passenger;

the electronic device generates heartrate data;

the amount of chemical energy that the anticipated passenger is transforming into heat is estimated, at least in part, from the heartrate data;

the electronic device generates image data of clothing that the anticipated passenger is wearing; and estimating the amount of heat that the anticipated passenger would be losing if the anticipated passenger were in the interior of the vehicle and subject to the climate includes estimating the thermal insulation of the clothing from the image data of the clothing.

According to a second aspect of the present invention, a method of changing the climate of the interior of a vehicle comprises: accepting data from an electronic device of an anticipated passenger that has hailed a vehicle with the electronic device, and data from the vehicle, the vehicle having a climate; analyzing both the data from the electronic device and the data from the vehicle to estimate metabolic heat production of the anticipated passenger, and heat that the anticipated passenger would lose if the anticipated passenger were in the interior of the vehicle and subject to the climate; and determining, from the estimated metabolic heat production and heat that the anticipated passenger would be losing, whether the climate is likely to be too hot or too cold to the anticipated passenger.

Embodiments of the second aspect of the invention can include any one or a combination of the following features:

before picking up the anticipated passenger, if the climate is determined to be too hot, then controlling one or more systems of the vehicle to alter the climate until the climate would not be too hot to the anticipated passenger before the anticipated passenger enters the interior of the vehicle;

before picking up the anticipated passenger, if the climate is determined to be too cold, then controlling one or more systems of the vehicle to alter climate until the climate would not be too cold to the anticipated passenger before the anticipated passenger enters the interior of the vehicle;

analyzing the data from the electronic device to estimate metabolic heat production of the anticipated passenger includes analyzing one or more of accelerometer data, location data and time data, from which a walking or running speed of the anticipated passenger can be determined, and heartrate data;

analyzing both the data from the electronic device and the data from the vehicle to estimate heat that the anticipated passenger would be losing if the anticipated passenger were in the interior of the vehicle and subject to the current climate includes analyzing blower level data, from which relative air velocity can be estimated, interior air temperature data, and interior relative humidity data;

controlling one or more systems of the vehicle to alter the climate until the climate would not be too hot to the anticipated passenger before the anticipated passenger enters the interior of the vehicle includes activating an air conditioner to lower the temperature of the air of the interior and increasing the level of a blower to increase the velocity of the air in the interior of the vehicle;

controlling one or more systems of the vehicle to alter the climate until the climate would not be too cold to the anticipated passenger before the anticipated passenger enters the interior of the vehicle includes activating a heater to increase the temperature of the air of the interior and decreasing the level of the blower to decrease the velocity of the air in the interior of the vehicle;

analyzing both the data from the electronic device and the data from the vehicle to estimate heat that the anticipated passenger would be losing if the anticipated passenger were in the interior of the vehicle and subject to the climate includes analyzing data from the vehicle concerning the temperature of the air of the exterior and the temperature of the air of the interior to estimate a mean radiant temperature of the interior of the vehicle that is between the temperature of the air of the interior and the temperature of the air of the exterior; and analyzing both the data from the electronic device and the data from the vehicle to estimate heat that the anticipated passenger would be losing if the anticipated passenger were in the interior of the vehicle and subject to the climate includes analyzing one or more of: (a) image data from the electronic device to estimate thermal insulation of clothing that the anticipated passenger is wearing; (b) location as a function of time data from the electronic device to determine the temperature of the air of the exterior at a location the anticipated passenger was at a specific time, and assigning the thermal insulation of clothing as a function of the temperature of the air of the exterior at that location and time; and (c) input data from the electronic device that the anticipated passenger inputted concerning the clothing that the anticipated passenger is wearing from which thermal insulation of the clothing is estimated.

According to a third aspect of the present invention, a method of setting a vehicle interior climate comprises: before an anticipated passenger enters a vehicle, and using data collected from an external electronic device and the vehicle, estimating metabolic heat production of the anticipated passenger; estimating heat that the anticipated passenger would lose while inside the vehicle; and controlling (a) climate system(s) of the vehicle so that the estimated metabolic heat production balances the estimated heat that the anticipated passenger would be losing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the specific devices and methods illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The Anticipated Passenger, the Electronic Device, and the Hailed Vehicle

Figure 1:
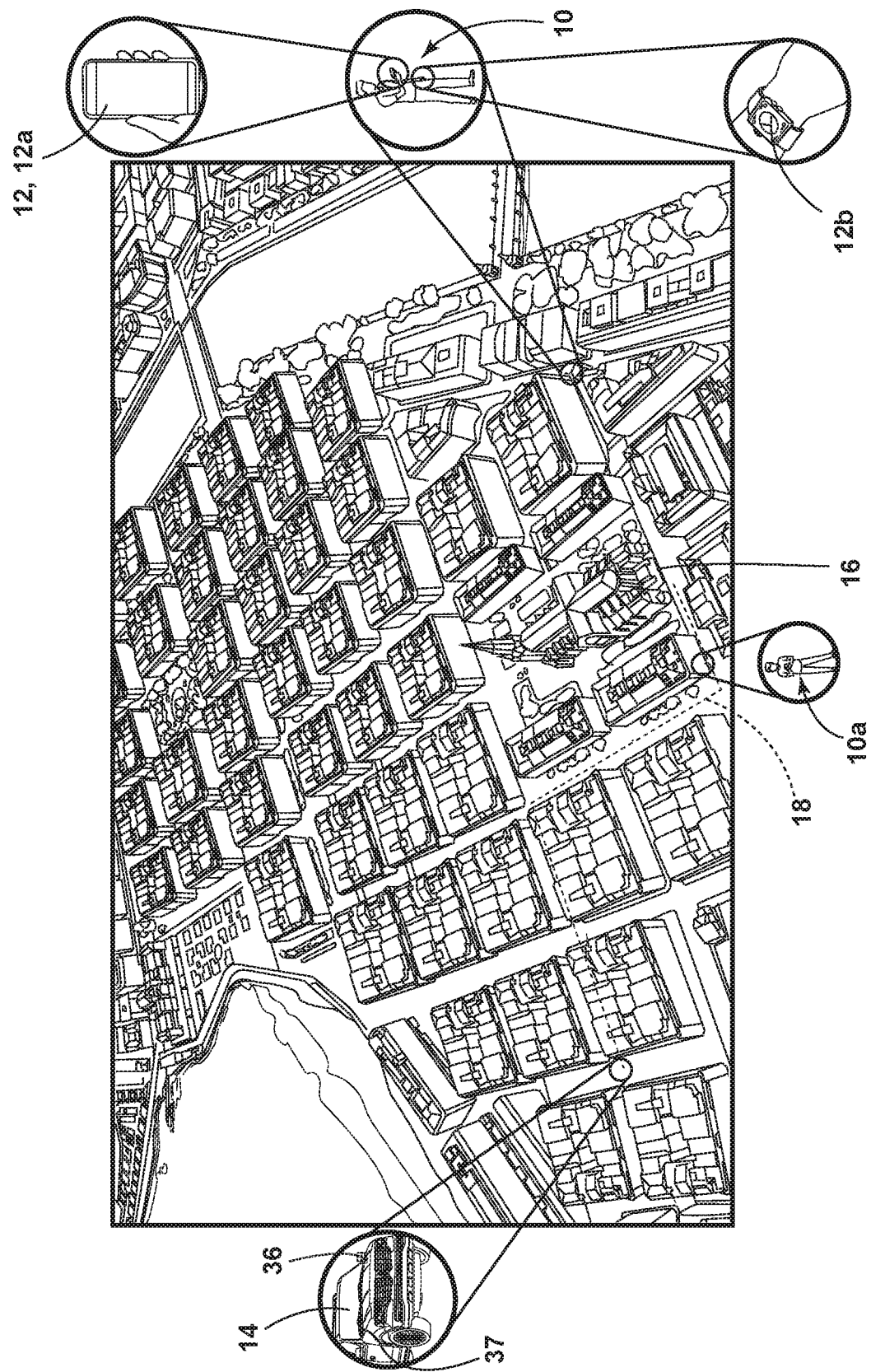
FIG. 1 is a perspective overhead view of a city, illustrating an anticipated passenger hailing a vehicle with an electronic device (smartphone) so that the vehicle and the anticipated passenger can meet at a location where the anticipated passenger will enter an interior of the vehicle.

Referring to FIG. 1, an anticipated passenger 10 is illustrated. The anticipated passenger 10 is utilizing an electronic device 12 to hail a vehicle 14 and become a passenger of the vehicle 14 at a location 16. The vehicle 14 is separated from the location 16 by a distance 18. After the anticipated passenger 10 hails the vehicle 14, both the vehicle 14 and the anticipated passenger 10 travel to the location 16 so that the anticipated passenger 10 can enter the vehicle 14. The location 16 can be approximately where the anticipated passenger 10 is located when the anticipated passenger 10 hails the vehicle 14, or can be someplace else. The electronic device 12 can be a smartphone 12*a*, such as the iPhone XS (Apple Inc., Cupertino, Calif.) and the Galaxy S9 (Samsung Electronics Co. Ltd., San Jose, Calif.), as well as a smartwatch 12*b*, such as the Apple Watch Series 3 (Apple Inc., Cupertino, Calif.) and the Ionic (Fitbit, San Francisco, Calif.), which can be paired with the smartphone 12*a* thus together for purposes of this disclosure constituting one electronic device 12. Such electronic devices 12 utilize application programs that third party vehicle-for-hire service providers provide to allow the anticipated passenger 10 to hail the vehicle 14. Such third party service providers include Uber (Uber Technologies Inc., San Francisco, Calif.) and Lyft (San Francisco, Calif.).

Figure 2:
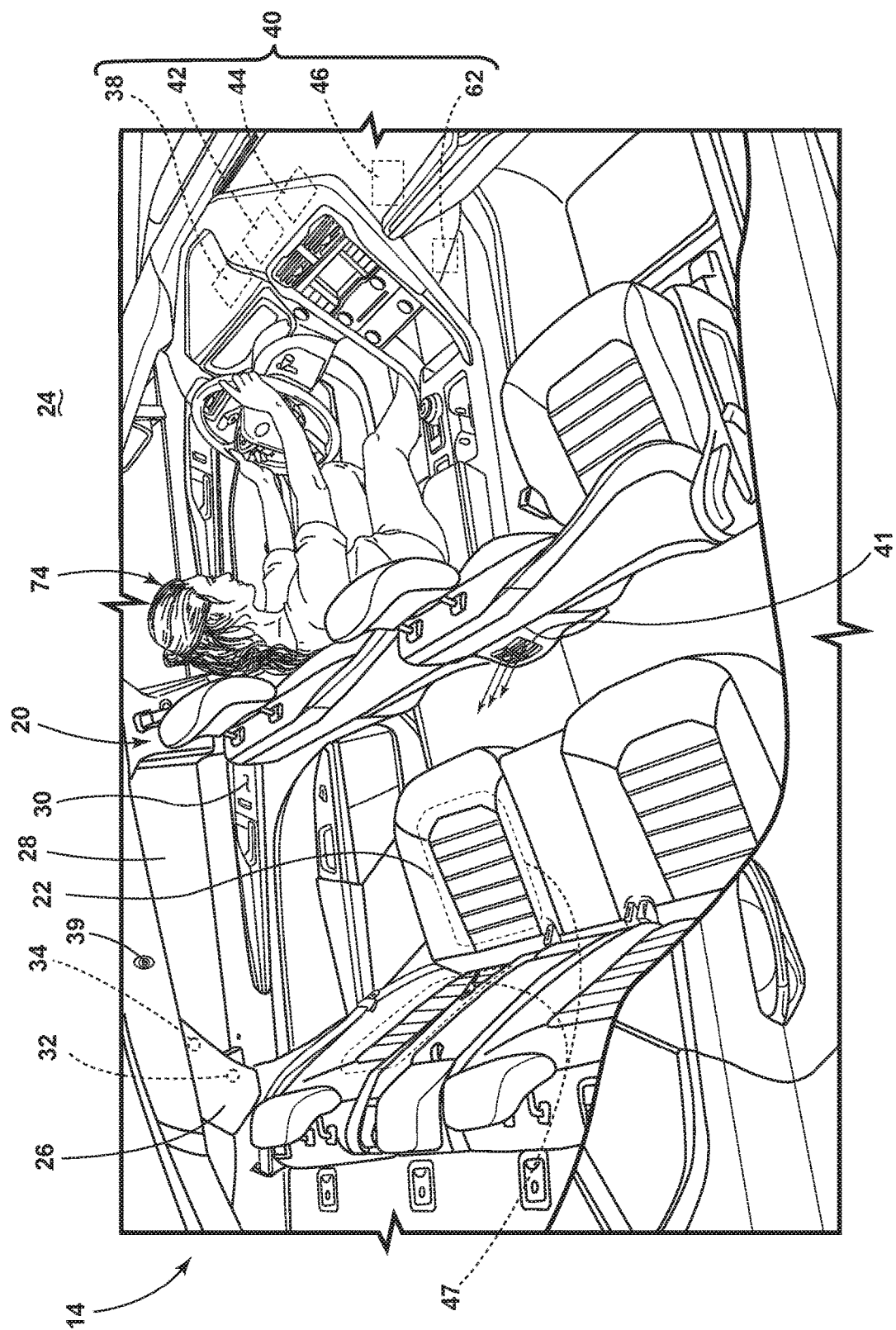
FIG. 2 is a perspective view of the interior of the vehicle of FIG. 1, illustrating a seat where the anticipated passenger will sit when the vehicle picks up the anticipated passenger, and a temperature sensor, a relative humidity sensor, an air conditioner, a heater, and an air blower all disposed within the vehicle and in communication with a controller.

Referring now to FIG. 2, the vehicle 14 has an interior 20 and a seat 22 disposed within the interior 20. In addition, the interior 20, being separated from an exterior 24 by a frame 26 and windows 28 of the vehicle 14, has its own climate. Air in the interior 20 has a temperature. Air in the interior 20 flows with a certain velocity. The air in the interior 20 has a relative humidity. Surfaces 30 of the interior 20, including the windows 28, either radiate heat into the interior 20, or extract heat from the interior 20, depending on the difference between the temperature of the air of the interior 20 and the temperature of the air of the exterior 24.

The vehicle 14 includes various sensors and mechanisms, from which data about the climate of the interior 20 can be collected or assumed. For example, the vehicle 14 includes an interior temperature sensor 32 and a relative humidity sensor 34, and can include an exterior temperature sensor 36 (see FIG. 1), an exterior camera 37, and a thermal infrared camera 39. The interior temperature sensor 32 provides data concerning the temperature of the air of the interior 20 of the vehicle 14. The relative humidity sensor 34 provides data concerning the relative humidity of the air of the interior 20 of the vehicle 14. The interior temperature sensor 32 and the relative humidity sensor 34 can be disposed in the same sensor unit, or can be separately disposed. The exterior temperature sensor 36 provides data concerning the temperature of the air of the exterior 24 of the vehicle 14. The exterior camera 37 provides image data, such as image data of the anticipated passenger 10. The thermal infrared camera 39 provides image data, from which the temperatures of surfaces of the interior 20 of the vehicle 14 can be calculated.

The vehicle 14 further includes a blower 38, which blows air into the interior 20 through a vent 41. The blower 38 can operate at various power levels. The higher the level the blower 38 operates, the higher the velocity of the air moving throughout the interior 20. Therefore, the velocity of the air can be assumed from the level at which the blower 38 is operating and, thus, can be calibrated depending on the type of blower 38 and model of the vehicle 14. In addition, to the extent that the vehicle 14 includes vents 41 that are independently controllable, the velocity of the air can be assumed from a degree at which one or more of the vents 41 are opened. In other words, the less the vent 41 at any particular area of the interior 20 is opened, the less the relative air velocity at that area will be for any given level at which the blower 38 is operating.

The vehicle 14 includes systems 40 that can be controlled to alter the climate of the interior 20 of the vehicle 14. As mentioned above, the vehicle 14 includes the blower 38, the level of which can be controlled to change the velocity of the air in the interior 20. In addition, the vehicle 14 includes a heater 42, an air conditioner 44, and a mechanism 46 to direct air from the exterior 24 into the interior 20, any of which can be controlled to change the temperature of the air of the interior 20. The heater 42 can be controlled to increase the temperature of the air of the interior 20. The air conditioner 44 can be controlled to decrease the temperature of the air of the interior 20. The mechanism 46, such as a flap, to direct air from the exterior 24 into the interior 20 can be controlled, depending on the difference between the temperature of the air of the interior 20 and the temperature of the air of the exterior 24, to either increase or decrease the temperature of the air of the interior 20. Further, the vehicle 14 includes a temperature control device 47 within the seat 22 that can be controlled to selectively raise or lower the temperature of the seat 22. The temperature control device 47 can be a heater (operating on the basis of electrical resistance, heated air, or otherwise), a cooler (operating on the basis of cooled air or otherwise), or a Peltier device that can selectively heat or cool depending on the direction of current flow, among other options.

Figure 3A:
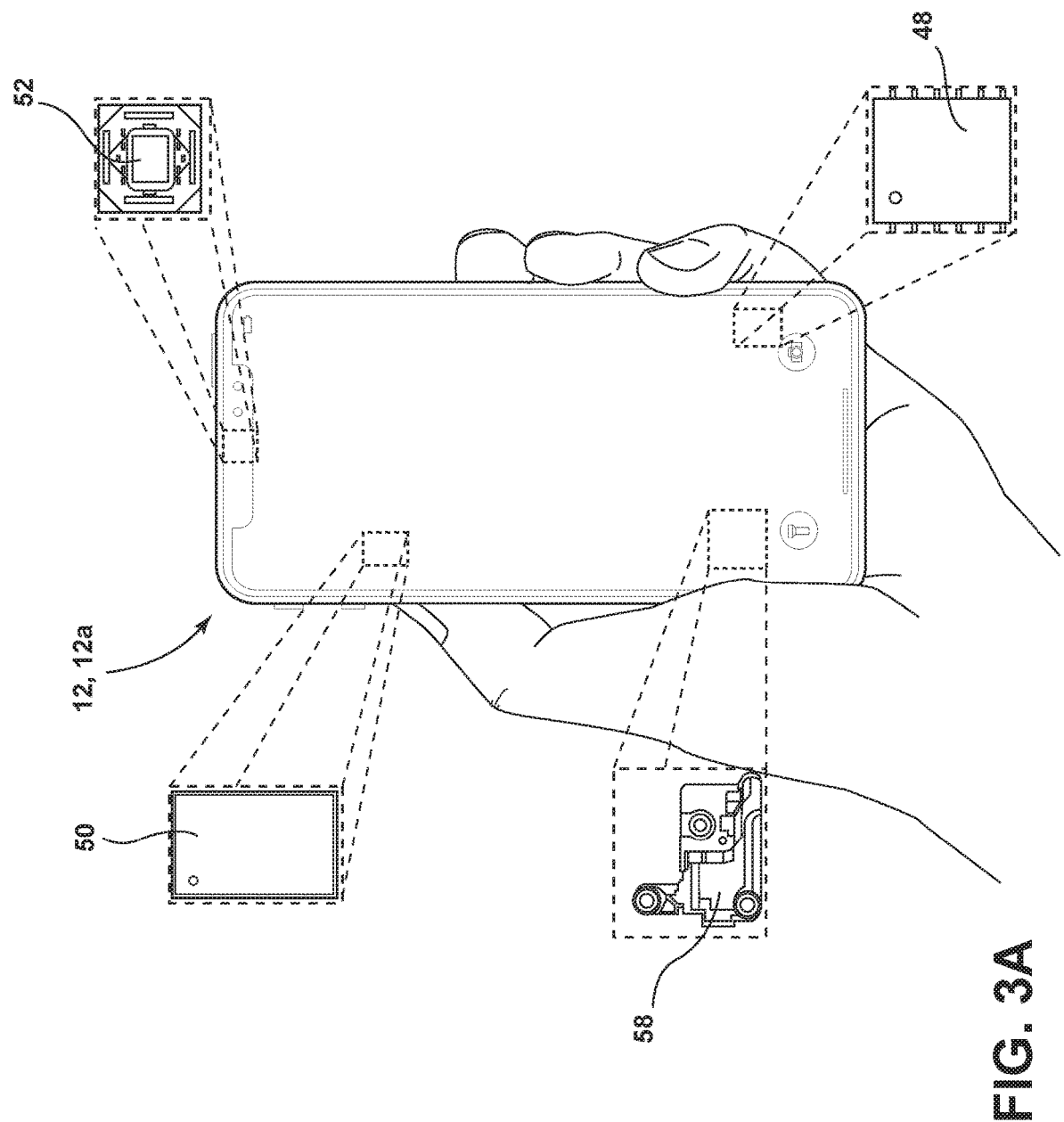
FIG. 3A is a front view of the electronic device (smartphone) of FIG. 1, illustrating the electronic device incorporating a GPS receiver, an accelerometer, an image sensor, and a cellular transmitter/receiver.
Figure 3B:
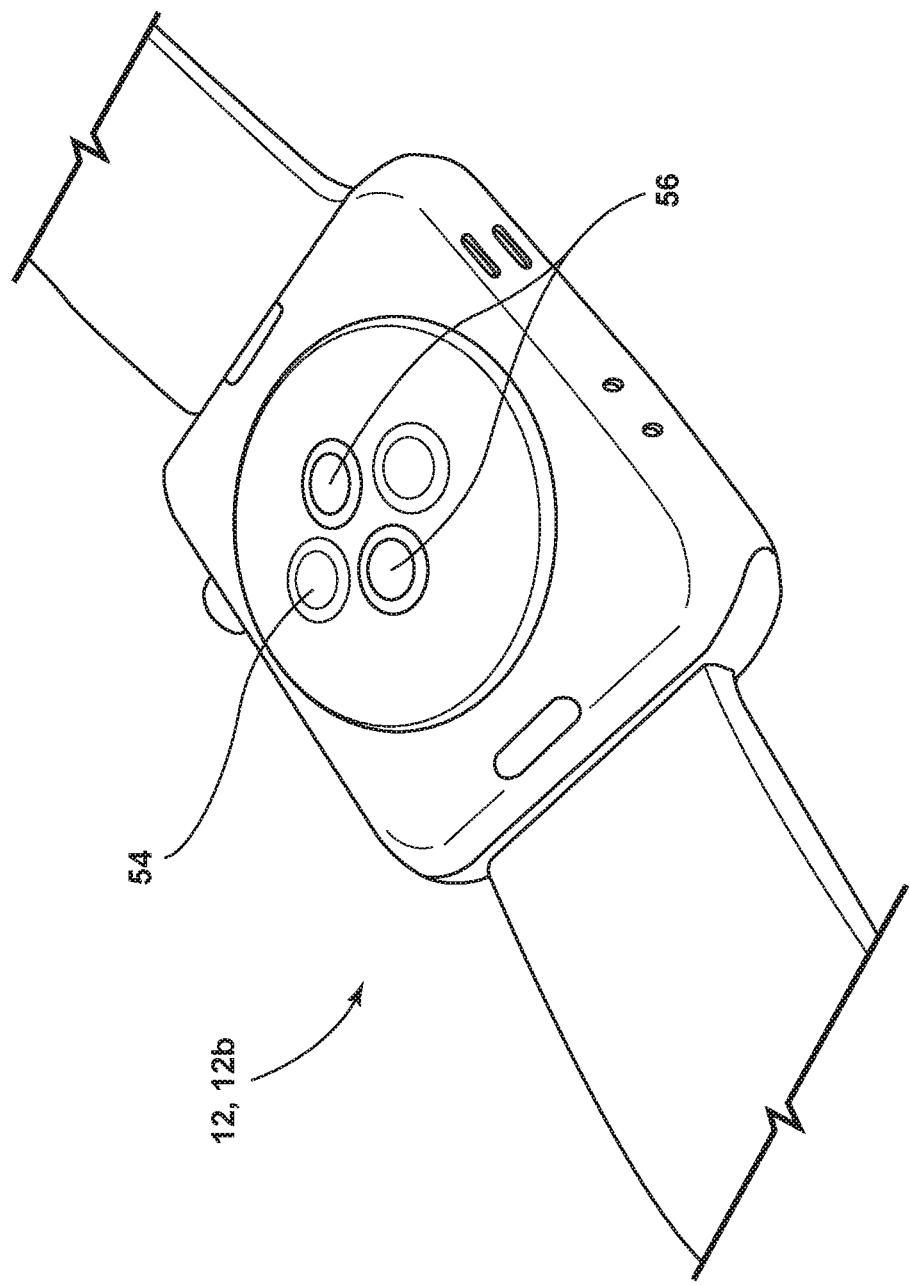
FIG. 3B is a rear view of the electronic device (smartwatch portion) of FIG. 1, illustrating a light emitter and light sensors used to generate heart rate data of the anticipated passenger.

Referring now to FIGS. 3A-3B, the electronic device 12 (such as the smartphone 12a) includes a variety of sensors and other devices that generate data. For example, the electronic device 12 includes an accelerometer 48. The accelerometer 48 generates acceleration data. In addition, the electronic device 12 includes a global positioning system (GPS) receiver 50. The GPS receiver 50 generates location and altitude as a function of time data. Further, the electronic device 12 includes an image sensor 52, which is part of a larger camera device. The image sensor 52 generates pixel data, from which an image of the light that the image sensor 52 sensed can be generated. Further, the electronic device 12 (such as the smartwatch 12b) can generate heartrate data, such as via light emitters 54 working in cooperation with light sensors 56 (photodiodes) or image sensors (which can be an ensemble of light sensors) to detect variations in blood coloration as a function of time (and thus heartrate data). Further, the electronic device 12 includes a cellular transmitter/receiver 58 (antenna). The cellular transmitter/receiver 58 allows the electronic device 12 to transmit and receive data over a cellular network 60, which is discussed further below.

Figure 4:
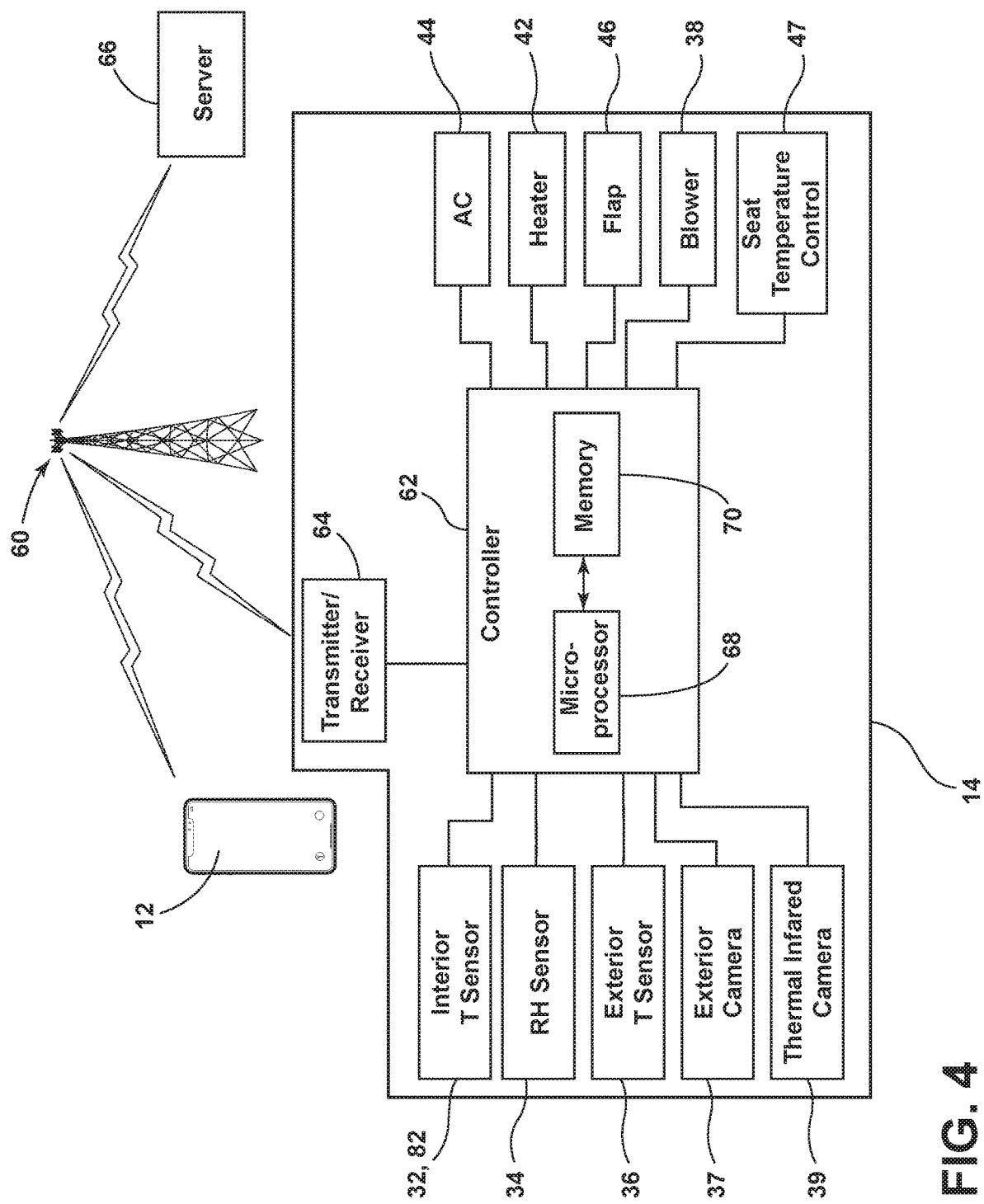
FIG. 4 is a schematic diagram of the controller of FIG. 2 being in communication with the interior temperature sensor, the relative humidity sensor, and an exterior temperature sensor, as well as a cellular transmitter/receiver, which allows the controller to receive data that the electronic device of FIGS. 3A and 3B generate via a server and through a cellular network.

Referring now to FIG. 4, the vehicle 14 further includes a controller 62 and a transmitter/receiver 64. The controller 62 is in communication with the transmitter/receiver 64. The transmitter/receiver 64 allows the controller 62 to transmit and receive data over the cellular network 60. The cellular network 60 is in communication with a server 66. The electronic device 12 can then generate data, transmit the data to the cellular network 60, which then transmits the data to the server 66. The server 66 can then transmit the data back to the cellular network 60, which then transmits the data to the transmitter/receiver 64 of the vehicle 14 and then to the controller 62. In this manner, and other manners, the controller 62 can accept data generated by the electronic device 12 of the anticipated passenger 10 of the vehicle 14.

The controller 62 is additionally in communication with the various sensors of the vehicle 14 described above. More specifically, the controller 62 is in communication and accepts data from the interior temperature sensor 32, the exterior temperature sensor 36, the relative humidity sensor 34, the exterior camera 37, and the thermal infrared camera 39, if included. Moreover, as discussed further below, the controller 62 is in communication with and controls the blower 38, and thus the level at which the blower 38 is blowing air into the interior 20, from which, as discussed above, the velocity of the air flowing through the interior 20 can be estimated. Likewise, the controller 62 is in communication with and controls the heater 42, the air conditioner 44, the mechanism 46, and the temperature control mechanism 47 within the seat 22.

The controller 62 includes a microprocessor 68 and a memory 70. The memory 70 stores programs and data. The microprocessor 68 executes the programs, and while so executing, can utilize the data stored in the memory 70.

PMV Thermal Comfort Model

The controller 62 includes a thermal comfort model, which can be stored in the memory 70 and executed by the microprocessor 68, to determine whether the climate would be thermally comfortable (that is, not too hot or not too cold) to the anticipated passenger 10 based on an analysis of data from both the electronic device 12 of the anticipated passenger 10 and the vehicle 14. At this point in time, the anticipated passenger 10 has hailed the vehicle 14 but has not entered the interior 20 of the vehicle 14. The vehicle 14 may be in route to the anticipated passenger 10, decreasing the distance 18 between the vehicle 14 and the anticipated passenger 10.

A well accepted thermal comfort model in the building construction context is the Predicted Mean Vote (PMV) model, and, to the inventors knowledge the PMV thermal comfort model has never been adapted to the vehicle 14 context. The PMV thermal comfort model utilizes principles of heat balance, recognizing that, to be thermally comfortable, the heat that the body of a person is generating should approximately balance the heat leaving the body of the person to the external environment. If heat loss exceeds heat generation, then the person is likely to be too cold. If heat generation exceeds heat loss, then the person is likely to be too hot. In other words, in terms of a heat balance equation, to be thermally comfortable:

$$(M-W) \approx E_c + E_{res} + C_{res} + H$$

where M is the amount of chemical energy in the body of the person being transformed into heat, W is the amount of chemical energy in the body of the person being transformed into work, $E_c$ is the heat loss from the skin of the person from evaporation of perspiration, $E_{res}$ is the heat loss from the person due to evaporation during breathing, $C_{res}$ is the heat loss from the person due to convection during breathing, and H is the heat loss from the person at the body surface due to convection and radiation. As further discussed below, each of the heat loss variables on the right side of the balance ($E_c$, etc.) can be determined via measurable or calculable variables. Those include: (a) the thermal insulation from clothing ($I_{cl}$); (b) air temperature ($t_a$); (c) mean radiant temperature ($t_r$); (d) relative air velocity ($v_{ar}$); and (e) relative humidity (RH). The amount of chemical energy in the body of the person being transformed into heat M is also referred to as the metabolic rate of the person and is quantifiable and, as discussed further below, is a function of the level of activity of the person.

The developers of the PMV model reviewed surveys of a large number of subjects that were subjected to various different conditions (differing air temperatures, thermal insulations, metabolic rate, etc.) and, from the surveys, derived an equation that predicts the mean vote of those subjects on a seven-point scale from too cold (−3) to too hot (+3). A result of zero is ideal and means that most people would find those circumstances thermally comfortable. A deviation of +/−0.5 from 0 is considered to represent tolerable thermal conditions, while a deviation beyond that range is considered to represent uncomfortable thermal conditions. Variations of the equation are standardized. Standard 55 of the American Society of Heating, Refrigerating and Air-Conditioning Engineers (ASHRAE) and Standard 7730 of the International Organization for Standardization (ISO) are examples.

The ISO 7730 PMV equation is immediately below.

$$PMV = [0.303 e^{-0.036 * M} + 0.028] *$$
$$\begin{cases} (M - W) - 3.05 * 10^{-3} * [5733 - 6.99 * (M - W) - p_a] - \\ 0.42 * [(M - W) - 58.15] - 1.7 * 10^{-5} * M * (5867 - p_a) - \\ 0.0014 * M * (34 - t_a) - 3.96 * 10^{-8} * f_{cl} * \\ [(t_{cl} + 273)^4 - (t_r + 273)^4] - f_{cl} * h_c * (t_{cl} - t_a) \end{cases}$$

In this equation, the variables are as follows:
M is the amount of chemical energy being transformed into heat (W/m$^2$);
W is the amount of chemical energy being transformed into work (W/m$^2$);
$I_{cl}$ is the thermal insulation from clothing (m$^2$K/W);
$f_{cl}$ is the clothing surface area factor;
$t_a$ is the air temperature (° C.);
$t_r$ is the mean radiant temperature (° C.);
$v_{ar}$ is the relative air velocity (m/s);
$p_a$ is the water vapor partial pressure (Pa);
$h_c$ is the convective heat transfer coefficient (W/(m$^2$K)); and
$t_{cl}$ is the clothing surface temperature (° C.).
The clothing surface temperature ($t_{cl}$) and convective heat transfer coefficient ($h_c$) are determined through iteration via the following equations:

$$t_{cl} = 35.7 - 0.028*(M-W) -$$
$$I_{cl}*\{3.96*10^{-8}*f_{cl}*[(t_{cl}+273)^4 - (t_r+273)^4]*f_{cl}*h_c*(t_{cl}-t_a)\}$$

$$h_c = \begin{cases} 2.38*|t_{cl}-t_a|^{0.25} & \text{if } > 12.1*\sqrt{v_{ar}} \\ 2.38*|t_{cl}-t_a|^{0.25} & \text{if } < 12.1*\sqrt{v_{ar}} \end{cases}$$

The clothing surface area factor is determined via the following equation:

$$f_{cl} = \begin{cases} 1.00 + 1.290*I_{cl} & \text{if } I_{cl} \le 0.078 \, m^2K/W \\ 1.05 + 0.645*I_{cl} & \text{if } I_{cl} > 0.078 \, m^2K/W \end{cases}$$

The water vapor partial pressure ($p_a$) can be determined from the relative humidity (RH), as follows, where ($p_{sat}$) is the saturated vapor pressure:

$$RH = \frac{p_a}{p_{sat}}$$

The saturated vapor pressure ($p_{sat}$) can be determined in a variety of ways, including through the following equation, with the air temperature ($T_a$) in degrees Kelvin and the saturated vapor pressure ($p_{sat}$) is returned in mmHg:

$$p_{sat} = e^{\left(20.386 - \frac{5132}{T_a}\right)}$$

Although it is not feasible to calculate the amount of chemical energy being transformed into heat (M) directly, there are methods of estimating the amount of chemical energy from various data such as activity type and heartrate, and this is discussed further below. Further, there are various tables available that provide insulation values for various clothing. Values are sometimes provided in units of clo (clothing units), where 1 clo=0.155 m$^2$K/W. For example, a naked person has a clo=0, while a typical men's business suit is considered to be 1 clo.

Estimating Metabolic Heat Production of the Anticipated Passenger and Estimating Heat the Anticipated Passenger Would Lose While Inside the Vehicle In general, the controller 62 analyzes both the data from the electronic device 12 and the vehicle 14 pursuant to the PMV thermal comfort model to determine whether the climate of the vehicle 14 is likely to be comfortable, too hot, or too cold, to the anticipated passenger 10, who has hailed the vehicle 14 but not yet entered the interior 20. That is, in terms of heat balance, the controller 62 estimates the metabolic heat production of the anticipated passenger 10, that is, the amount of chemical energy that the anticipated passenger 10 is transforming into heat. In addition, the controller 62 estimates the heat that the anticipated passenger 10 would lose while inside (in the interior 20 of) the vehicle 14 and subject to the climate. That estimation includes, as explained in the heat balance equation above, estimating at least heat that the anticipated passenger 10 would be losing through evaporation during breathing, through convection during breathing, through convection and radiation at the body surface, and through evaporation of perspiration. Hereinafter, this disclosure discussed how the controller 62 (or server 66) does so, for each of the relevant variables discussed above.

M—Amount of Chemical Energy Being Transformed Into Heat

Figure 5:
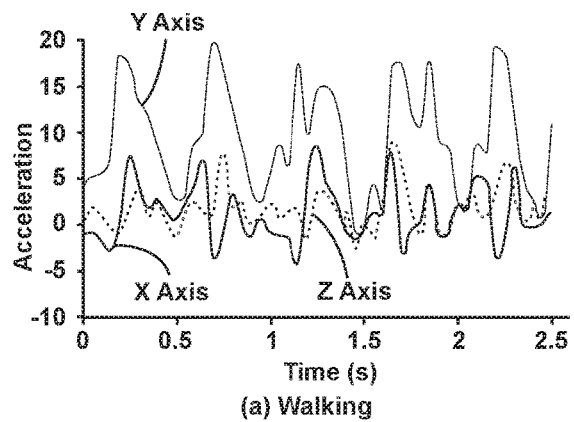
FIG. 5 is a compendium of graphs illustrating that different activities such as walking and sitting generate different signatures in terms of acceleration data.
Figure 5:
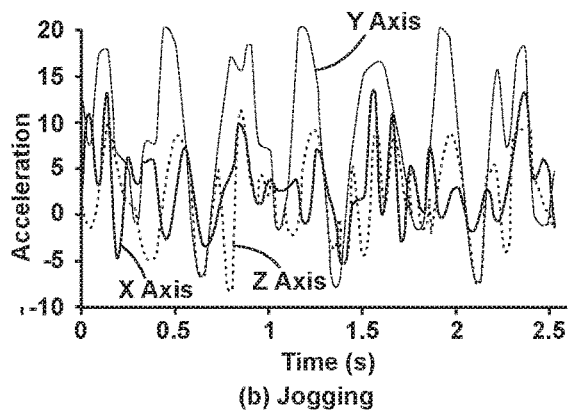
Figure 5:
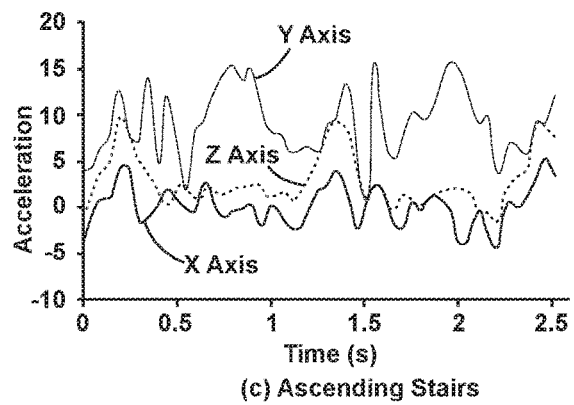
Figure 5:
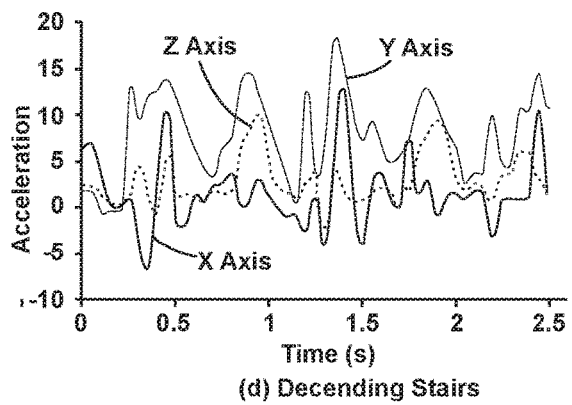
Figure 5:
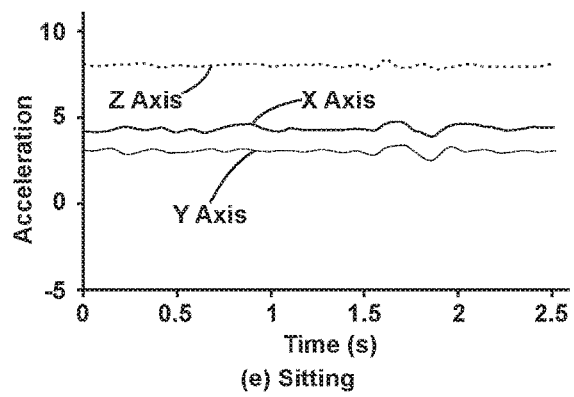
Figure 5:
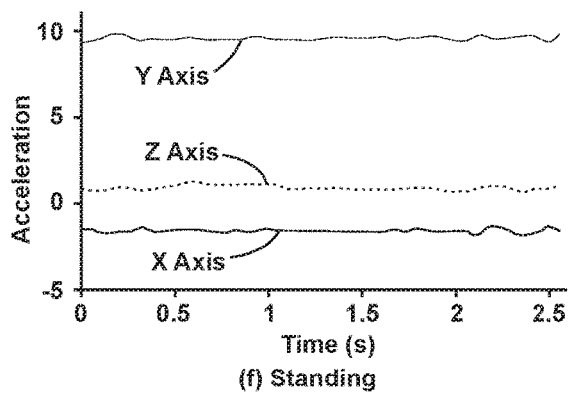

The controller 62 executing the above thermal comfort model in the context of the anticipated passenger 10 and the interior 20 of the vehicle 14, would then need to estimate the amount of chemical energy that the anticipated passenger 10 is transforming into heat—M in the equation above. The controller 62 can do so from data that the electronic device 12 generates. As mentioned above, the electronic device 12 includes the accelerometer 48, which generates acceleration data. Referring now to FIG. 5, various activities in which the anticipated passenger 10 engages provide distinct acceleration data signatures. See Kwapisz, J. et al., *Activity Recognition using Cell Phone Accelerometers* (available at https://www.techfak.uni-bielefeld.de/isypraktikum/WS12SS13/VITAL/media/p74-kwapisz.pdf), which is incorporated herein by reference. If the acceleration data reveals no variations in gravitational force, or small and irregular variations in gravitational force, then it can be assumed that the anticipated passenger 10 is either sitting or standing still. Acceleration data generated while the anticipated passenger 10 is sitting leaves a different signature than acceleration data generated while the anticipated passenger 10 is standing. If the acceleration data reveals larger and regular variations, then it can be assumed that the anticipated passenger 10 is doing something more active than standing and the estimated metabolic equivalent for task (MET) value assigned can be higher. The larger and more rapid the variations, the larger the MET value assigned. As FIG. 5 reveals, acceleration data generated while walking, jogging, ascending stairs, and descending stairs all have different data signatures. Acceleration data can also reveal the gait of the person, from which a load the person is carrying can be assumed and estimated. In other words, if the acceleration data reveals that the person is tilted in a certain direction, it can be assumed the person is tilting to offset the load that the person is carrying, which would result in a larger assigned MET value. Once the activity (sitting, standing, etc.) of the anticipated passenger 10 is determined, the activity can be matched with an MET value to estimate the amount of chemical energy that the anticipated passenger 10 is transforming into heat—M. For example, sitting might be matched with an MET value of 1.0 (58.2 W/m$^2$) while standing might be matched with an MET value of 1.2 (69.6 W/m$^2$). Such MET values are available from different publications, such as Mansoubi, M., et al., *Energy expenditure during common sitting and standing tasks: examining the 1.5 MET definition of sedentary behavior*, BMC Public Health, 2015; 15:516 (available at https://www.ncbi.nlm.nih.gov/pmc/articles/PMC4448542/), and ASHRAE 55, 2004, Appendix A, both of which are incorporated herein by reference.

As mentioned above, in addition to the accelerometer 48, the electronic device 12 includes the GPS receiver 50, which generates location as a function of time data. The controller 62 can estimate the amount of chemical energy that the anticipated passenger 10 is transforming into heat, at least in part, from the location as a function of time data by calculating the speed of the anticipated passenger 10. For a hypothetical example, the controller 62 can deduce from the GPS data that the anticipated passenger 10 was moving at 5 km/hr for 20 minutes before hailing the vehicle 14 and is continuing to do so after hailing the vehicle 14. From the accelerometer data, the controller 62 can ascertain that the anticipated passenger 10 was walking (because of the regular positive to negative to positive fluctuations in gravitational forces), rather than riding on a bicycle (which would have a different data signature). The controller 62 can then assign an MET value of for example 3.4 (197.2 W/m$^2$).

As mentioned above, in addition to the accelerometer 48 and the GPS receiver 50, the electronic device 12 can generate heartrate data of the anticipated passenger 10, and the amount of chemical energy that the anticipated passenger 10 is transforming into heat is estimated, at least in part, from the heartrate data. In other words, the metabolic rate of the anticipated passenger 10 can be estimated from the heartrate of the person, and various studies have offered equations for calculating an estimated MET value from a measured heartrate. See, e.g., Yamamoto, S. et al., *The simple method for predicting metabolic equivalents using heart rate in patients with cardiovascular disease*, Int J Cardiol Heart Vasc. 2018 June; 19: 88-89 (available at https://www.ncbi.nlm.nih.gov/pmc/articles/PMC6003065/), which is hereby incorporated herein by reference. Such an equation utilized might be MET=0.05×Heartrate$_{absolute}$−1.0. Thus, for a hypothetical example, the controller 62 can obtain heartrate data from the electronic device 12 that the anticipated passenger 10 has an average heartrate of 130 beats per minute for a certain period of time, and assign an MET value of 5.5 (320.1 W/m$^2$) (i.e., (0.05*130)−1.0=5.5 METs).

The data from the electronic device 12 utilized need not be data generated after the anticipated passenger 10 hailed the vehicle 14. While such post-hailing data is certainly relevant, pre-hailing data is relevant as well, especially when there is a short period of time between when the anticipated passenger 10 hailed the vehicle 14 and when the anticipated passenger 10 is anticipated to enter the vehicle 14. In some instances, as the anticipated passenger 10 approaches the vehicle 14, the controller 62 can utilize the exterior camera 37 disposed on the vehicle 14 to validate or invalidate the assumptions made upon which the assigned MET value relied. The controller 62 can revise the MET value based on the data from the exterior camera 37, if the value previously assigned based on the above assumptions was invalid.

W—Amount of Chemical Energy Being Transformed Into Work

The anticipated passenger 10 will be sitting in the seat 22 of the vehicle 14. Thus, the anticipated passenger 10 will be transforming only a negligible amount of chemical energy into work. Therefore, the controller 62 will assume W to be zero (0) in the PMV equation.

$I_{cl}$—Thermal Insulation from Clothing

Figure 6:
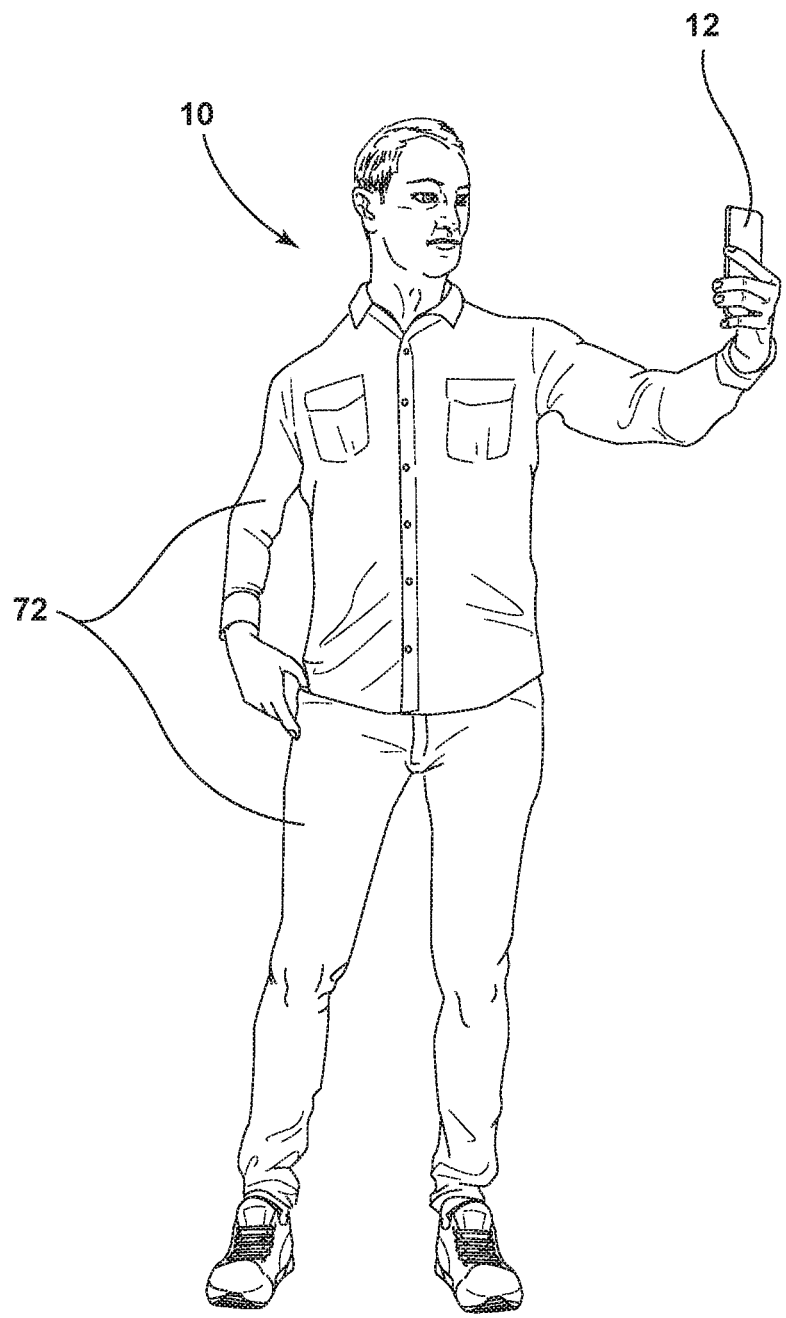
FIG. 6 is a perspective view of the anticipated passenger of FIG. 1 capturing an image of the anticipated passenger with the electronic device, to allow for an estimation of a thermal insulation value of clothing that the anticipated passenger is wearing.

Referring now to FIG. 6, the last PMV variable personal to the anticipated passenger 10 is the thermal insulation from clothing 72 that the anticipated passenger 10 is wearing. The controller 62 executing the above thermal comfort model in the context of the anticipated passenger 10 and the interior 20 of the vehicle 14, would mean need to estimate the level of thermal insulation of the clothing 72 that the anticipated passenger 10 is wearing—$I_{cl}$ in the equation above. In other words, part of estimating the amount of heat that the anticipated passenger 10 would be losing if the anticipated passenger 10 were in the interior 20 of the vehicle 14 and subject to the climate includes estimating the thermal insulation of the clothing 72 that the anticipated passenger 10 is wearing. The controller 62 can do so from data that the electronic device 12 generates.

One option for doing so is through the use of image data from the electronic device 12 of the clothing 72 that the anticipated passenger 10 is wearing to estimate the thermal insulation of the clothing 72 that the anticipated passenger 10 is wearing. As mentioned, the electronic device 12 includes the image sensor 52 that generates image data. After the anticipated passenger 10 hails the vehicle 14, or as part of that process, the application program prompts the anticipated passenger 10 to take an image of the anticipated passenger 10 including the clothing 72 that the anticipated passenger 10 is wearing. The thermal insulation of the clothing 72 that the anticipated passenger 10 is wearing is then estimated from the image data. Analysis of the image data can include identifying the outline of the anticipate passenger 10 in the image data, identifying the face and skin color of the face, comparing the skin color of the face to the remainder of the image of the anticipated passenger 10 to detect bare skin and thus the ratio of covered skin to bare skin, and assigning a thermal insulation clo value based on the ratio. For example, a relatively fully covered (e.g., 95% or greater) anticipated passenger 10 can be assigned a thermal insulation clo value of 1, whereas an anticipated passenger 10 wearing a short sleeve shirt and thus having approximately 80% covered skin might be assigned a thermal insulation clo value of 0.8, and an anticipated passenger 10 wearing a dress or tank top and thus having approximately 50% covered skin might be assigned a thermal insulation clo value of 0.5. Alternatively, analysis of the image data can be pursuant to a clothing recognition program, which can identify various clothing 72 that the anticipated passenger 10 is wearing (e.g., tie, dress shirt, sports coat, dress, winter coat, etc.) and assign a clo value accordingly. There are tables available that assign a clo value for: (1) a clothing ensemble; and (2) individual pieces of clothing. See ASHRAE 55:2004, Tables B1 and B2, which are incorporated herein by reference. The assigned clo values can be calibrated and these are meant as examples illustrative of the underlying principle of assigning a thermal insulation value from image data of the clothing 72 of the anticipated passenger 10. The controller 62 can perform this analysis of the image data. Alternatively, the server 66 or the electronic device 12 can perform this analysis of the image data, and can be a function that the application program provides. Alternatively, a driver 74 of the vehicle 14 can perform the analysis manually upon reviewing the image data. Alternatively, as modern versions of the electronic device 12 begin to incorporate infrared cameras, a clo value can be determined from infrared image data of the anticipated passenger 10 by either the electronic device 12 or the server 66. See Lee, J. et al., *Estimating Clothing Thermal Insulation Using an Infrared Camera*, (Mar. 9, 2016) (available at https://www.mdpi.com/1424-8220/16/3/341/pdf-vor), which is incorporated herein by reference. In some instances, instead of the electronic device 12 providing the image data, another vehicle near the anticipated passenger 10 can capture image data of the anticipated passenger 10 and send the image data to the server 66.

Instead of using image data from the electronic device 12 to estimate the thermal insulation of the clothing 72 that the anticipated passenger 10 is wearing, the controller 62 can use the GPS receiver 50 generated location as a function of time data from the electronic device 12. More specifically, the controller 62 analyses the GPS receiver 50 generated location as a function of time data, determines the location of the anticipated passenger 10 at a time when the anticipated passenger 10 was likely to select the clothing 72 to wear for the day (such as 06:00), queries a database (e.g., https://w1.weather.gov/data/obhistory/KLNK.html) to determine the temperature of the air of the exterior at that location at that time, and then assign a value of the thermal insulation of the clothing 72 as a function of the temperature of the air of the exterior 24 at that location at that time. Instead of the controller 62 performing this action, the server 66 can, and the resulting thermal insulation value can be returned to the controller 62. For example, the controller 62 can assign a higher thermal insulation value for the clothing 72 as the external temperature is lower, assuming that the anticipated passenger 10 will dress more warmly in colder weather than in warmer weather. A thermal insulation value of 1.0 might be assigned for external air temperatures below 45° F., while a thermal insulation value of 0.45 might be assigned for external air temperatures above 75° F., and various thermal insulation values for temperatures in between.

Finally, the electronic device 12 can prompt the anticipated passenger 10 to identify the clothing 72 the anticipated passenger 10 is wearing. The electronic device 12 can generate input data from the input of the anticipated passenger 10 concerning the clothing 72 that the anticipated passenger 10 is wearing. For example, the application program with which the anticipated passenger 10 used to hail the vehicle 14 can ask the anticipated passenger 10 generally what clothing 72 the anticipated passenger 10 is wearing and provide selectable options (such as in a drop down list) such as: short sleeve shirt and jeans; business suit; swimming suit; and so on. The anticipated passenger 10 selects the option most accurately describing the clothing 72 and the selection is recorded as input data. This input data can be forwarded to the server 66, which can estimate a thermal insulation clo value from the input data. The server 66 can then forward the thermal insulation clo value to the controller 62.

In some instances, as the anticipated passenger 10 approaches the vehicle 14, the controller 62 can utilize the exterior camera 37 disposed on the vehicle 14 to validate or invalidate the assumptions made about the clothing 72 the anticipated passenger 10 is wearing. The controller 62 can revise the thermal insulation clo value based on the data from the exterior camera 37, if the value previously assigned based on the above assumptions was invalid.

$t_a$—Temperature of the Air of the Interior 20 of the Vehicle 14

A PMV variable relating to the climate of the interior 20 of the vehicle 14 is the temperature of the air of the vehicle 14 ($t_a$). The controller 62 executing the above thermal comfort model in the context of the anticipated passenger 10 and the interior 20 of the vehicle 14 must determine the temperature of the air of the interior 20 of the vehicle 14. In other words, part of estimating the amount of heat that the anticipated passenger 10 would be losing if the anticipated passenger 10 were in the interior 20 of the vehicle 14 and subject to the climate includes determining the temperature of the air of the interior 20. The controller 62 can do so from data that the vehicle 14 generates. In particular, as mentioned above, the vehicle 14 includes the temperature sensor 32 disposed to measure the temperature of the air in the interior 20. Ideally, the temperature sensor 32 is positioned at where the anticipated passenger 10 will be sitting in the interior 20, such as near the seat 22.

RH—Relative Humidity of the Air of the Interior 20 of the Vehicle 14

Another PMV variable relating to the climate of the interior 20 of the vehicle 14 is the relative humidity of the air of the vehicle 14 (RH). The controller 62 executing the above thermal comfort model in the context of the anticipated passenger 10 and the interior 20 of the vehicle 14 must determine the relative humidity of the air of the interior 20 of the vehicle 14. In other words, part of estimating the amount of heat that the anticipated passenger 10 would be losing if the anticipated passenger 10 were in the interior 20 of the vehicle 14 and subject to the climate includes determining the relative humidity of the air of the interior 20. The controller 62 can do so from data that the vehicle 14 generates. In particular, as mentioned above, the vehicle 14 includes the relative humidity sensor 34 disposed to measure the temperature of the air in the interior 20. Ideally, the relative humidity sensor 34 is positioned at where the anticipated passenger 10 will be sitting in the interior 20, such as near the seat 22.

$t_r$—Mean Radiant Temperature of the Interior 20 of the Vehicle 14

Another PMV variable relating to the climate of the interior 20 of the vehicle 14 is the mean radiant temperature of the interior 20 of the vehicle 14 ($t_r$). The controller 62 executing the above thermal comfort model in the context of the anticipated passenger 10 and the interior 20 of the vehicle 14 should estimate the mean radiant temperature of the interior 20 of the vehicle 14. In other words, part of estimating the amount of heat that the anticipated passenger 10 would be losing if the anticipated passenger 10 were in the interior 20 of the vehicle 14 and subject to the climate includes determining or estimating the relative humidity of the air of the interior 20. The controller 62 can do so from data that the vehicle 14 generates. The temperature of many of the surfaces 30 of the interior 20 of the vehicle 14 will match the temperature of the air of the interior 20. However, the windows 28 are not well insulated. Thus, the windows 28 will radiate heat into the interior 20 of the vehicle 14 when the temperature of the air of the exterior 24 is greater than the temperature of the air of the interior 20, and will extract heat from the interior 20 of the vehicle 14 when the temperature of the air of the exterior 24 is less than the temperature of the air of the interior 20. Therefore, the controller 62 can utilize data from the exterior temperature sensor 36 and the interior temperature sensor 32 of the vehicle 14, and estimate a mean radiant temperature that is between the temperature of the air of the interior 20 and the temperature of the air of the exterior 24. For example, assuming the temperature of the air of the interior 20 is 20° C. and the temperature of the air of the exterior 24 is 0° C., the controller 62 can estimate that the mean radiant temperature is between 0° C. and 20° C., but closer to 20° C. such as 19° C. In summary, the controller 62 can derive the mean radiant temperature of the interior 20 of the vehicle 14 from the difference in temperature between the temperature of the air of the interior 20 and the temperature of the air of the exterior 24. In some instances, if the vehicle 14 includes the thermal infrared camera 39, the mean radiant temperature of the interior 20 of the vehicle 14 can be calculated from image data generated by the thermal infrared camera 39.

$v_{ar}$—The Relative Velocity of the Air of the Interior 20

The final PMV variable relating to the climate of the interior 20 of the vehicle 14 is the relative velocity of the air of the interior 20 of the vehicle 14 that would contact the anticipated passenger 10 when the anticipated passenger 10 is seated in the seat 22 of the vehicle 14 ($v_{ar}$). The controller 62 executing the above thermal comfort model in the context of the anticipated passenger 10 and the interior 20 of the vehicle 14 should either determine or estimate the relative velocity. In other words, part of estimating the amount of heat that the anticipated passenger 10 would be losing if the anticipated passenger 10 were in the interior 20 of the vehicle 14 and subject to the climate includes determining or estimating the relative velocity of the air. The controller 62 can do so from data that the vehicle 14 generates. As mentioned, the vehicle 14 includes the air blower 38 to blow air into the interior 20 of the vehicle 14, and the air blower 38 is configured to blow air at different power levels. In other words, the power level of the blower 38 can be adjusted to increase or decrease the volume of air that the blower 38 blows per unit of time. The higher the volume of air per unit of time, the higher the relative velocity of the air flowing throughout the interior 20 of the vehicle 14. This will likely require calibration. Nevertheless, the controller 62 can estimate a value for the relative velocity of the air as a function of the power level of the blower 38.

Controlling Climate Systems 40 of the Vehicle 14 so Estimated Metabolic Heat Production Balances Estimated Heat that the Anticipated Passenger 10 Would be Losing After the anticipated passenger 10 has hailed the vehicle 14, and the controller 62 (or server 66) has estimated the metabolic heat production of the anticipated passenger 10 and estimated the heat that the anticipated passenger 10 would lose while inside the vehicle 14 (via data from the electronic device 12 of the anticipated passenger 10 and the vehicle 14), the controller 62 determines whether said heat production and predicted heat loss would balance such that the anticipated passenger 10 is likely to experience thermal comfort (or, alternatively, be too hot or too cold). As explained above, the controller 62 can do that via the PMV calculation. If the result of the PMV calculation is outside of an allowed difference from zero (0), such as +/−0.5 signifying that the anticipated passenger 10 is likely to be too hot or too cold, then the controller 62 controls various of the climate systems 40 of the vehicle 14 (the heater 42, air conditioner 44, the temperature control element 47 of the seat 22, etc.) as necessary until, and so that, the estimated metabolic heat production approximately balances the estimated heat that the anticipated passenger 10 would be losing (at which point, the anticipated passenger 10 would be likely to experience thermal comfort). Stated another way, if the controller 62 determines, from the data applied to the thermal comfort model, that the climate of the interior 20 of the vehicle 14 would not be comfortable (because, e.g., of the imbalance between the heat loss and heat produced), the controller 62 controls the system(s) 40 of the vehicle 14 to change the climate until the climate would be comfortable to the anticipated passenger 10 under the thermal comfort model before the anticipated passenger 10 enters the interior 20 of the vehicle 14. Before picking up the anticipated passenger 10, if the climate is determined to be too hot, then the controller 62 controls the system(s) 40 of the vehicle 14 to alter the climate until the climate would not be too hot to the anticipated passenger 10 (representing approximate thermal balance) before the anticipated passenger 10 enters the interior 20 of the vehicle 14. Before picking up the anticipated passenger 10, if the climate is determined to be too cold, then the controller 62 controls the system(s) 40 of the vehicle 14 to alter the climate until the climate would not be too cold to the anticipated passenger 10 before the anticipated passenger 10 enters the interior 20 of the vehicle 14. In some instances, the controller 62 can calculate a time required to adjust the climate and delay the adjustment of the climate so that the climate is finally adjusted only approximately when the anticipated passenger 10 is estimated to enter the vehicle 14. The delay could result in energy savings.

The variables relative to the vehicle 14 that the controller 62 can alter include the temperature of the air of the interior 20 ($t_a$), the relative air velocity ($v_{ar}$), and, to a certain extent, the relative humidity of the air of the interior 20 of the vehicle 14 (RH) and the mean radiant temperature of the interior 20 of the vehicle 14 ($t_r$). The controller 62 can control the aforementioned system(s) 40 of the vehicle 14 to alter those variables. For example, to change the climate to so that the climate would be comfortable under the thermal comfort model, the controller 62 can alter the level at which the air blower 38 is blowing air to alter the velocity of the air in the interior 20 that would contact the anticipated passenger 10. In addition, to change the climate so that the climate would be comfortable under the thermal comfort model, the controller 62 can activate the air conditioner 44 to lower the temperature of the air of the interior 20. Further, to change the climate so that the climate would be comfortable under the thermal comfort model, the controller 62 can activate the heater 42 to increase the temperature of the air of the interior 20. Activation of the heater 42, the flap 46, and the air conditioner 44 can alter the relative humidity of the air of the interior 20 as well. Similarly, to change the climate so that the climate would be comfortable under the thermal comfort model, the controller 62 can activate the temperature control device 47 of the seat 22 to increase or lower, to a certain extent, the temperature of the air of the interior 20 and the mean radiant temperature of the interior 20 of the vehicle 14.

This altering of the climate is occurring while the vehicle 14 is decreasing the distance 18 to the location 16 to allow the anticipated passenger 10 to enter the interior 20 of the vehicle 14. By the time that the anticipated passenger 10 enters the interior 20 of the vehicle 14, the controller 62 has adjusted the climate so that the climate is determined to be comfortable to the anticipated passenger 10 under the thermal model (i.e., approximate balance between heat loss and heat generation). A PMV value within the tolerable range from 0 demonstrates that the climate of the interior 20 now would be comfortable to the anticipated passenger 10.

The anticipated passenger 10 can be assigned a profile that is stored at the server 66. To the extent that the anticipated passenger 10 requests changes to the climate of the vehicle 14 after entering the interior 20, the changes can be recorded and sent by the controller 62 to the server 66 and attributed to the profile of the anticipated passenger 10. The server 66 can thus learn the climate preferences of the anticipated passenger 10 and alter a baseline target PMV value. In other words, if the actions of the anticipated passenger 10 regarding climate after the anticipated passenger 10 enters the vehicle 14 reveal that the anticipated passenger 10 desires a warmer climate than that which a PMV value of 0 would command, then the target PMV value for the anticipated passenger 10 can be some number greater than 0, such as 0.5. The different target PMV value can be applied by the server 66 and the controller 62 for future rides in the vehicle 14, subject to future learning due to additional requests by the anticipated passenger 10 to alter the climate that was pre-conditioned pursuant to the adjusted PMV target value.

Vehicle 14 with Multiple Anticipated Passengers 10, 10a and Multiple Climates

Figure 7:
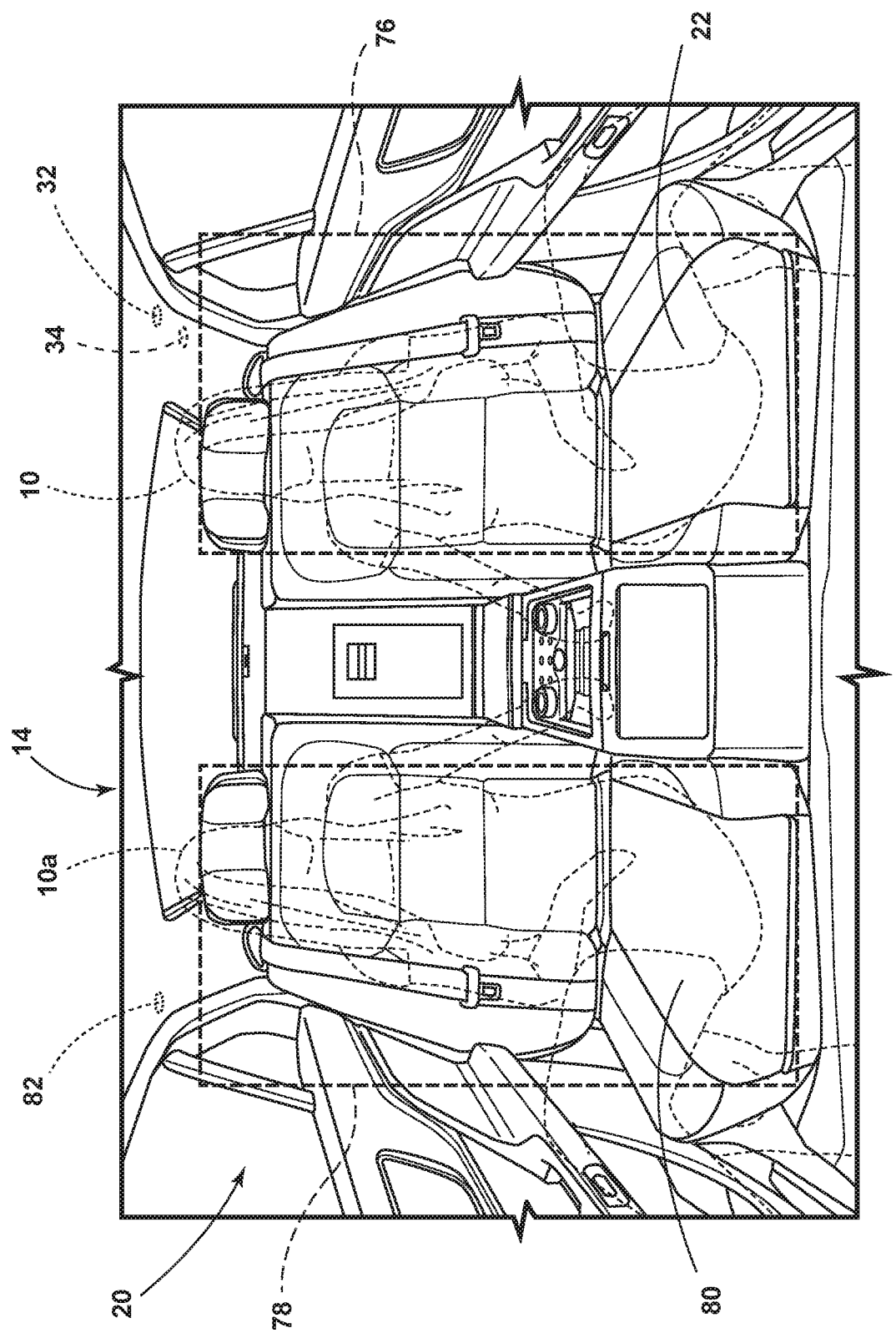
FIG. 7 is a front view of the interior of the vehicle of FIG. 1, illustrating another seat for a second anticipated passenger next to the seat where the anticipated passenger will sit, and the interior is divided into a first zone proximate the seat for the anticipated passenger and a second zone proximate the other seat for the second anticipated passenger, each of the first zone and the second zone having their own respective climates and each climate is individually controllable to maximize independently the thermal comfort of the anticipated passenger and the second anticipated passenger.

Referring now to FIG. 7, the interior 20 of the vehicle 14 is divided into a first zone 76 corresponding to the seat 22 and a second zone 78 corresponding to another seat 80. The climate at each of the first zone 76 and the second zone 78 are separately controllable. For example, the temperature of the air of the interior 20 at the first zone 76 can be different than the temperature of the air of the interior 20 at the second zone 78. In addition, to the extent that the vent 41 that blows air into the first zone 76 is controllable separately from the vent 41 that blows air into the second zone 78, or there are separate air blowers 38 for each of the first zone 76 and the second 78, the relative air velocity at each of the first zone 76 and the second zone 78 can be separately manipulated. In addition to the temperature sensor 32 adjacent the seat 22 to measure the temperature of the air of the interior 20 at the first zone 76, the vehicle 14 can include a temperature sensor 82 adjacent the other seat 80 to measure the temperature of the air of the interior 20 at the second zone 78.

After the anticipated passenger 10 hails the vehicle 14 and before the vehicle 14 arrives at the location 16 so the anticipated passenger 10 can enter the interior 20, a second anticipated passenger 10a can also hail the vehicle 14 using a separate electronic device 12a (not separately illustrated, but including all the features described above for the electronic device 12). Both the anticipated passenger 10 and the second anticipated passenger 10a will eventually occupy the vehicle 14 at the same time. The second anticipated passenger 10a may enter the vehicle 14 before the anticipated passenger 10, or vice versa. The controller 62 (or server 66) can anticipate that the anticipated passenger 10 will occupy the seat 22 and become subject to the climate of the first zone 76, and that the second anticipated passenger 10a will occupy the other seat 80 and become subject to the climate of the second zone 78.

As described above, the controller 62 accepts data from the electronic device 12 of the anticipated passenger 10, data from the electronic device 12a of the second anticipated passenger 10a, and data from the vehicle 14. The controller 62 analyzes data from the electronic device 12 of the anticipated passenger 10 and the vehicle 14 pursuant to the thermal comfort model to determine whether the climate at the first zone 76 would be comfortable to the anticipated passenger 10. The data from the vehicle 14 can be as described above, including data from the temperature sensor 32 measuring the temperature of the air at the first zone 76, the relative humidity sensor 34, and regarding the power level of the air blower 38. In addition, the controller 62 analyzes data from the electronic device 12a of the second anticipated passenger 10a and the vehicle 14 pursuant to the thermal comfort mode; to determine whether the climate at the second zone 78 would be comfortable to the second anticipated passenger 10a. The data from the vehicle 14 can be as described above, including data from the temperature sensor 82 measuring the temperature of the air at the second zone 78, the relative humidity sensor 34, and regarding the power level of the air blower 38.

If, after executing the thermal comfort model, the controller 62 determines that the climate at the first zone 76 would not be comfortable to the anticipated passenger 10, then the controller 62 controls the system(s) 40 of the vehicle 14 to change the climate of the first zone 76 until the climate would be comfortable to the anticipated passenger 10 pursuant to the thermal comfort model before the anticipated passenger 10 enters the interior 20 of the vehicle 14. Likewise, if, after executing the thermal comfort model, the controller 62 determines if the climate at the second zone 78 would not be comfortable to the second anticipated passenger 10a, then the controller 62 controls the system(s) 40 of the vehicle 14 to change the climate of the second zone 78 until the climate would be comfortable to the second anticipated passenger 10a pursuant to the thermal comfort model before the second anticipated passenger 10a enters the interior 20 of the vehicle 14. The vehicle 14 then picks up the second anticipated passenger 10a and the anticipated passenger 10 and both are inside the interior 20 of the vehicle 14.

HYPOTHETICAL EXAMPLE 1

The anticipated passenger 10 hails the vehicle 14 via an application program executed by the electronic device 12. The vehicle 14 will meet the anticipated passenger 10 at the location 16 of the anticipated passenger 10. The vehicle 14 is approximately 5 minutes away under current traffic conditions. The electronic device 12 transmits accelerometer data and GPS location as a function of time data for the last half hour to the server 66, which relays the data to the controller 62 in the vehicle 14. Analyzing the accelerometer data and GPS location as a function of time data, the controller 62 concludes that the anticipated passenger 10 has been walking at an average speed of 2.5 mph for the last 30 minutes. The GPS location as a function of time data reveals that the anticipated passenger 10 has moved 1.25 miles in the last 30 minutes, and the accelerometer data reveals a signature of walking as confirmation. The controller 62, preloaded with table data assigning various MET values for various walking speeds, assigns an MET value of 2.2 METs (M=128 W/m$^2$). The application program that the electronic device 12 is executing to hail the vehicle 14 prompts the anticipated passenger 10 to capture an image of the anticipated passenger 10. The anticipated passenger 10 uses a camera capability of the electronic device 12 to capture an image of the anticipated passenger 10 thus creating image data. The electronic device 12 sends the image data to the server 66. The server 66, executing a clothing 72 recognition program, recognizes that the anticipated passenger 10 is likely wearing a business suit as clothing 72 and assigns a thermal insulation from clothing ($I_{cl}$) value of 1 clo (0.155 m$^2$K/W). The server 66 transmits that value to the controller 62. The controller 62 accepts data from the vehicle 14 indicating that the temperature of the air of the interior 20 ($t_a$) is 22° C. (~72° F.). The controller 62 receives data from the exterior temperature sensor 36 indicating that the exterior temperature is 30° C. (86° F.). The controller 62 thus assumes that the mean radiant temperature ($t_r$) of the interior 20 of the vehicle 14 is greater than the temperature of the interior 20 ($t_a$) of 22° C., and estimates the mean radiant temperature ($t_r$) of the interior to be 23° C. (~73° F.). The controller 62 receives data from the relative humidity sensor 34 that the relative humidity (RH) of the air of the interior 20 of the vehicle 14 is 40%. The controller 62 is causing the air blower 38 to blow air at a certain power level and estimates from this power level that the relative velocity of the air of the interior 20 ($v_{ar}$) is 0.3 m/s. The controller 62, using the above data and using the PMV thermal model equation stored in the memory 70, calculates that the PMV value is 1.03. That PMV value, being outside of a predetermined acceptable range from 0 (e.g., +/−0.5), reveals that the climate of the interior 20 is likely to be too hot for the anticipated passenger 10 to feel comfortable. As the vehicle 14 is driving towards the location 16 to retrieve the anticipated passenger 10, the controller 62 controls one or more systems 40 of the vehicle 14 to alter the climate until the climate would not be too hot to the anticipated passenger 10 before the anticipated passenger 10 enters the interior 20 of the vehicle 14. That includes the controller 62 activating the air conditioner 44 to lower the temperature of the air of the interior 20 ($t_a$) and increases the level of the air blower 38 to increase the relative velocity of the air in the interior 20 of the vehicle 14 such that the relative velocity of the air of the interior 20 ($v_{ar}$) is 1.0 m/s. In addition, the controller 62 activates the temperature control element 47 of the seat 22 to extract heat (i.e., cool). As the vehicle 14 is reaching the location 16, the air conditioner 44 has caused the temperature of the air of the interior 20 ($t_a$) to decrease to 17° C. (~63° F.), and the temperature control element 47 of the seat 22 to cool the seat 22 to feel 17° C. (~63° F.), with an estimated mean radiant temperature ($t_r$) of the interior generally of 18° C. (~64° F.). The controller 62 calculates the new PMV value to be 0.03, within the acceptable range of +/−0.5 from 0, and the anticipated passenger 10 is likely to feel thermally comfortable within the climate of the interior 20. The anticipated passenger 10 then enters the interior 20 of the vehicle 14 and sits in the seat 22.

HYPOTHETICAL EXAMPLE 2

The anticipated passenger 10 hails the vehicle 14 via an application program executed by the electronic device 12. The vehicle 14 will meet the anticipated passenger 10 at the location 16 of the anticipated passenger 10. The vehicle 14 is approximately 5 minutes away under current traffic conditions. The anticipated passenger 10 wears the smartwatch 12b that is paired with the smartphone 12a (collectively being the electronic device 12), and the smartwatch 12b is contemporaneously measuring and recording the heartrate of the anticipated passenger 10 and thus creating heartrate data. The electronic device 12 sends heartrate data to the server 66 indicating that the anticipated passenger 10 has a current heartrate of 80 beats per minute and assigns an MET value of 1.0 (M=58.2 W/m²) pursuant to an equation that calculates an MET value from heartrate. The server 66 sends the MET value to the controller 62. The electronic device 12 further sends the GPS location as a function of time data to the server 66. The server 66 determines from the GPS data that the anticipated passenger 10 was located at a certain place at 06:00 and queries a website to determine that the exterior temperature of that certain place at that time was 0° C. (32° F.). The server 66 then assigns a thermal insulation from clothing 72 ($I_{cl}$) value of 1.2 clo (0.155 m²K/W) based on a formula that estimates thermal insulation from clothing 72 ($I_{cl}$) value from the exterior temperature. The server 66 relays the thermal insulation from clothing 72 ($I_{cl}$) value to the controller 66. The controller 66 accepts data from the interior temperature sensor 32 indicating that the temperature of the air of the interior 20 ($t_a$) is 19° C. (−66° F.). The controller 62 receives data from the exterior temperature sensor 36 indicating that the exterior temperature is 8° C. (~46° F.). The controller 62 thus assumes that the mean radiant temperature ($t_r$) of the interior 20 of the vehicle 14 is less than the temperature of the interior 20 ($t_a$) of 19° C., and estimates the mean radiant temperature ($t_r$) of the interior 20 to be 18° C. (~64° F.). The controller 62 receives data from the relative humidity sensor 34 that the relative humidity (RH) of the air of the interior 20 of the vehicle 14 is 40%. The controller 62 is causing the air blower 38 to blow air at a certain power level and estimates from this power level that the relative velocity of the air of the interior 20 ($v_{ar}$) is 1.0 m/s. The controller 62, using the above data and using the PMV thermal model equation stored in the memory 70, calculates that the PMV value is −1.69. That PMV value, being outside of a predetermined acceptable range from 0 (e.g., +/−0.5), reveals that the climate of the interior 20 is likely to be too cold for the anticipated passenger 10 to feel comfortable. As the vehicle 14 is driving towards the location 16 to retrieve the anticipated passenger 10, the controller 62 controls one or more systems 40 of the vehicle 14 to alter the climate until the climate would not be too cold to the anticipated passenger 10 before the anticipated passenger 10 enters the interior 20 of the vehicle 14. That includes the controller 62 activating the heater 42 to increase the temperature of the air of the interior 20 ($t_a$) and decrease the level of the air blower 38 to decrease the relative velocity of the air in the interior 20 of the vehicle 14 such that the relative velocity of the air of the interior 20 ($v_{ar}$) is 0.4 m/s. As the vehicle 14 is reaching the location 16, the air conditioner 44 has caused the temperature of the air of the interior 20 ($t_a$) to increase to 23° C. (~73° F.), with an estimated mean radiant temperature ($t_r$) of the interior 20 of 22° C. (~72° F.). The controller 62 causes the temperature control device 47 of the seat 22 to produce sufficient heat to cause the seat 22 to feel 23° C. (~73° F.). The controller 62 calculates the new PMV value to be 0.31, within the acceptable range of +/−0.5 from 0, and the anticipated passenger 10 is likely to feel thermally comfortable within the climate of the interior 20. As the anticipated passenger 10 approaches the vehicle 14, the exterior camera 37 of the vehicle 14 captures image data of the anticipated passenger 10, from which the controller 62 confirms that the clothing 72 that the anticipated passenger 10 is wearing should be assigned a thermal insulation from clothing 72 ($I_{cl}$) value of 1.2 clo (0.155 m²K/W). The anticipated passenger 10 then enters the interior 20 of the vehicle 14 and sits in the seat 22. The vehicle 14 has picked up the anticipated passenger 10.

HYPOTHETICAL EXAMPLE 3

The anticipated passenger 10 hails the vehicle 14 via an application program executed by the electronic device 12. The vehicle 14 will meet the anticipated passenger 10 at the location 16 of the anticipated passenger 10. The vehicle 14 is approximately 5 minutes away under current traffic conditions. While in route to the anticipated passenger 10, the second anticipated passenger 10a hails the vehicle 14 via the application program executed by the separate electronic device 12a belonging to the second anticipated passenger 10a. The vehicle 14 will pick up the second anticipated passenger 10a while in route to pick up the anticipated passenger 10. Both the electronic device 12 of the anticipated passenger 10 and the electronic device 12a of the second anticipated passenger 10a send respective accelerometer data and GPS location as a function of time data for the last half hour to the server 66, which then relays the data to the controller 62 in the vehicle 14. Analyzing the accelerometer data and GPS data, the controller 62 concludes that the anticipated passenger 10 has been walking at an average speed of 2.5 mph for the last 30 minutes, while the second anticipated passenger 10a has been standing still for the last 30 minutes. The controller 62, preloaded with table data assigning various MET values for levels of physical activity, assigns an MET value of 2.2 METs (M=128 W/m²) for the anticipated passenger 10 and an MET value of 1 MET (M=58.2 W/m²) for the second anticipated passenger 10a. The application program that the electronic device 12 of the anticipated passenger 10 and the electronic device 12a of the second anticipated passenger 10a are executing to hail the vehicle 14 each prompt the anticipated passenger 10 and the second anticipated passenger 10a respectively to enter data concerning the clothing 72 that each are wearing. Presented with a drop down list offering various examples of clothing 72 ensembles, the anticipated passenger 10 selects "walking shorts and short sleeve shirt" and the application program assigns a thermal insulation from clothing 72 ($I_{cl}$) value of 0.36 clo (0.056 m²K/W). The electronic device 12 transmits that input data to the server 66, which then transmits that value to the controller 62. Presented with the same drop down list offering various examples of clothing 72 ensembles, the second anticipated passenger 10a selects "ankle-length skirt, long-sleeved shirt, suit jacket, and panty hose" and the application program assigns a thermal insulation from clothing 72 ($I_{cl}$) value of 1.1 clo (0.17 m²K/W). The electronic device 12a transmits that input data to the server 66, which then transmits that value to the controller 62. The controller 62 accepts data from the vehicle 14 indicating that the temperature of the air of the interior 20 ($t_a$) at both the first zone 76 and the second zone 78 is 21° C. (~70° F.). The controller 62 receives data from the exterior temperature sensor 36 indicating that the exterior temperature is also 21° C. (~70° F.). The controller 62 thus assumes that the mean radiant temperature ($t_r$) of the interior 20 of the vehicle 14 is the same as the temperature of the interior 20 ($t_a$) of 21° C., and estimates the mean radiant temperature ($t_r$) of the interior 20 to be 21° C. (~70° F.). The controller 62 receives data from the relative humidity sensor 34 that the relative humidity (RH) of the air of the interior 20 of the vehicle 14 is 40%. The controller 62 is causing the air blower 38 to blow air at a certain power level and estimates from this power level that the relative velocity of the air of the interior 20 ($v_{ar}$) is 0.5 m/s. The controller 62, using the above data and using the PMV thermal model equation stored in the memory 70, calculates: (1) that the PMV value relative to the anticipated passenger 10 is −0.41; and (2) that the PMV value relative to the second anticipated passenger 10a is 0.85. The PMV value of −0.41 for the anticipated passenger 10, being within the predetermined acceptable range from 0 (e.g., +/−0.5), reveals that the climate of the interior 20 at the first zone 76 is likely to be comfortable to the anticipated passenger 10. However, the PMV value of 0.85 for the second anticipated passenger 10a, being outside of a predetermined acceptable range from 0 (e.g., +/−0.5), reveals that the climate of the interior 20 at the second zone 78 is likely to be too hot for the second anticipated passenger 10a to feel comfortable. As the vehicle 14 is driving towards the location 16 to retrieve the second anticipated passenger 10a, the controller 62 controls one or more systems 40 of the vehicle 14 to alter the climate at the second zone 78 until the climate at the second zone 78 would not be too hot to the second anticipated passenger 10a before the second anticipated passenger 10a enters the interior 20 of the vehicle 14 at the second zone 78. That includes the controller 62 activating the air conditioner 44 to lower the temperature of the air of the interior 20 ($t_a$) at the second zone 78 and increasing the level of the air blower 38 to increase the relative velocity of the air at the second zone 78 of the vehicle 14 such that the relative velocity of the air of the interior 20 ($v_{ar}$) at the second zone 78 is 1.0 m/s. The controller 62 maintains the level of the air blower 38 blowing air toward the first zone 76 such that the relative velocity of the air of the interior 20 ($v_{ar}$) at the first zone 76 is 0.5 m/s. As the vehicle 14 is reaching the location 16, the air conditioner 44 has caused the temperature of the air of the interior 20 ($t_a$) at the second zone 78 to decrease to 18° C. (~64° F.), with a new estimated mean radiant temperature ($t_r$) of the interior 20 of 20° C. (~64° F.). The controller 62 calculates the new PMV value for the second anticipated passenger 10a at the second zone 78 to be 0.37, within the acceptable range of +/−0.5 from 0, and the second anticipated passenger 10a is likely to feel thermally comfortable within the climate of the interior 20 at the second zone 78. In addition, the controller 62 calculates the new PMV value for the anticipated passenger 10 at the first zone 76 due to the change in estimated mean radiant temperature ($t_r$) of the interior 20 from 21° C. (~70° F.) to 20° C. (~64° F.), and the new PMV value is 0.49, which is still within the acceptable range from zero (0), denoting comfort. The second anticipated passenger 10a then enters the interior 20 of the vehicle 14 occupying the other seat 80 and is subject to the climate of the second zone 78, which is thermally comfortable to the second anticipated passenger 10a. Sometime later, the anticipated passenger 10 then enters the interior 20 of the vehicle 14 occupying the seat 22 and is subject to the climate of the first zone 76, which is thermally comfortable to the anticipated passenger 10. The vehicle 14 transports the anticipated passenger 10 and the second anticipated passenger 10a to their respective destinations.

Methodology Variation

Instead of initially determining, using the PMV thermal comfort model, whether the anticipated passenger 10 would be thermally comfortable in the climate of the vehicle 14, and then adjusting the climate of the vehicle 14 so that the anticipated passenger 10 would be comfortable before the anticipated passenger 10 enters the interior 20, an initial threshold determination can be whether the anticipated passenger 10 is thermally comfortable in the exterior 24. If, using the PMV thermal comfort model, the anticipated passenger 10 is thermally comfortable in the exterior 24, then the vehicle 14 does not alter the climate of the interior 20 of the vehicle 14. However, if pursuant to the PMV thermal comfort model, is thermally uncomfortable in the exterior 24, then the vehicle 14 does alter the climate of the interior 20 of the vehicle 14 as described above. In this variation, the determination of whether the anticipated passenger 10 is thermally comfortable in the exterior 24 using the PMV thermal comfort model, requires the temperature of the air of the exterior 24 to be utilized as the $t_a$ value, the relative humidity of the air of the exterior 24 to be utilized as the RH value, the mean radiant temperature of the exterior 24 to be utilized as the $t_r$ value, and the relative velocity of the air of the exterior 24 to be utilized as the $v_{ar}$ value. When the anticipated passenger 10 is assumed to be outside (i.e., from the GPS receiver 50 generated location as a function of time data), then the server 66 can query a weather website for all of those values. When the anticipated passenger 10 is assumed to be inside, then the temperature of the air of the exterior 24 $t_a$ value can be estimated from the temperature of the battery of the electronic device 12. See https://opensignal.com/reports/battery-temperature-weather/. The rest of the values can be determined from the weather website, as mentioned.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departure from the concepts of the present disclosure, and further it is to be understood that such concepts are intended to be covered by the following claims unless these claims by their language expressly state otherwise.

What is claimed is:

1. A method of changing the climate of an interior of a vehicle comprising:
   accepting data from an electronic device of an anticipated passenger of a vehicle, the vehicle having an interior with a climate, and data from the vehicle, analyzing both the data from the electronic device and the vehicle pursuant to a thermal comfort model to determine whether the climate would be comfortable to the anticipated passenger,
   if the climate would not be comfortable, then controlling one or more systems of the vehicle to change the climate until the climate would be comfortable to the anticipated passenger pursuant to the thermal comfort model before the anticipated passenger enters the interior of the vehicle, and
   picking up the anticipated passenger after the climate would be comfortable to the anticipated passenger pursuant to the thermal comfort model.

2. The method of claim 1 further comprising: accepting data from an electronic device of a second anticipated passenger of the vehicle, the interior of the vehicle having a first zone and a second zone, each having a climate, and the data from the vehicle,
   analyzing both the data from the electronic device of the anticipated passenger and the vehicle pursuant to the thermal comfort model to determine whether the climate at the first zone would be comfortable to the anticipated passenger,
   analyzing both the data from the electronic device of the second anticipated passenger and the vehicle pursuant to the thermal comfort model to determine whether the climate at the second zone would be comfortable to the second anticipated passenger;
   if the climate at the first zone would not be comfortable to the anticipated passenger, then controlling the one or more systems of the vehicle to change the climate of the first zone until the climate would be comfortable to the anticipated passenger pursuant to the thermal comfort model before the anticipated passenger enters the interior of the vehicle;
   if the climate at the second zone would not be comfortable to the second anticipated passenger, then controlling the one or more systems of the vehicle to change the climate of the second zone until the climate would be comfortable to the second anticipated passenger pursuant to the thermal comfort model before the second anticipated passenger enters the interior of the vehicle, and
   picking up the second anticipated passenger.

3. The method of claim 1,
   wherein, analyzing the data from the electronic device includes estimating an amount of chemical energy that the anticipated passenger is transforming into heat.

4. The method of claim 1,
   wherein, analyzing both the data from the electronic device and the vehicle includes estimating an amount of heat that the anticipated passenger would be losing if the anticipated passenger were in the interior of the vehicle and subject to the climate.

5. The method of claim 4, wherein, the thermal comfort model estimates the amount of heat that the anticipated passenger would be losing by estimating at least the amount of heat that the anticipated passenger would be losing through evaporation during breathing, through convection during breathing, through convection and radiation at the surface of the body of the anticipated passenger, and through evaporation of perspiration.

6. The model of claim 1,
   wherein, the one or more systems of the vehicle to be controlled to change the climate until the climate would be comfortable to the anticipated passenger pursuant to the thermal comfort model include a heater, a vent, an air conditioner to change a temperature of air of the interior, and a temperature control device to change a temperature of a seat of the vehicle.

7. The method of claim 1,
   wherein, the one or more systems of the vehicle to be controlled to change the climate until the climate would be comfortable to the anticipated passenger pursuant to the thermal comfort model include an air blower to alter a velocity of air in the interior.

8. The method of claim 4,
   wherein, the amount of heat that the anticipated passenger would be losing if the anticipated passenger were in the interior of the vehicle and subject to the climate is estimated, at least in part from, a temperature of the air of the interior.

9. The method of claim 4,
   wherein, the amount of heat that the anticipated passenger would be losing if the anticipated passenger were in the interior of the vehicle and subject to the climate is estimated, at least in part from, a relative humidity of the air of the interior.

10. The method of claim 4,
    wherein, the amount of heat that the anticipated passenger would be losing if the anticipated passenger were in the interior of the vehicle and subject to the climate is estimated, at least in part from, a mean radiant temperature of the interior of the vehicle derived from a difference in temperature between a temperature of air of the interior and a temperature of air of an exterior to the vehicle.

11. The method of claim 1 further comprising:
    the anticipated passenger hailing the vehicle with the electronic device.

12. The method of claim 4,
    the vehicle including an air blower to blow air into the interior of the vehicle, the air blower configured to blow the air at different levels of power;
    wherein, the amount of heat that the anticipated passenger would be losing if the anticipated passenger were in the interior of the vehicle and subject to the climate is estimated, at least in part from, from the level of power at which the air blower is blowing the air into the interior.

13. The method of claim 3,
    the electronic device including an accelerometer that generates acceleration data; and
    wherein, the amount of chemical energy that the anticipated passenger is transforming into heat is estimated, at least in part, from the acceleration data.

14. The method of claim 3,
    the electronic device including a global positioning system receiver, which generates location as a function of time data; and the amount of chemical energy that the anticipated passenger is transforming into heat is estimated, at least in part, from the location as a function of time data by calculating a speed of the anticipated passenger.

15. The method of claim 3, the electronic device generating heartrate data; and the amount of chemical energy that the anticipated passenger is transforming into heat is estimated, at least in part, from the heartrate data.

16. The method of claim 4, the electronic device generating image data of clothing that the anticipated passenger is wearing; and estimating the amount of heat that the anticipated passenger would be losing if the anticipated passenger were in the interior of the vehicle and subject to the climate includes estimating thermal insulation of the clothing from the image data of the clothing.

17. A method of changing a climate of an interior of a vehicle comprising:

accepting data from an electronic device of an anticipated passenger that has hailed a vehicle with the electronic device, and data from the vehicle, the vehicle having an interior with a climate;

analyzing both the data from the electronic device and the data from the vehicle to estimate
metabolic heat production of the anticipated passenger, and
heat that the anticipated passenger would lose if the anticipated passenger were in the interior of the vehicle and subject to the climate; and determining, from the estimated metabolic heat production and heat that the anticipated passenger would be losing, whether the climate is likely to be too hot or too cold to the anticipated passenger;

before picking up the anticipated passenger, if the climate is determined to be too hot, then controlling one or more systems of the vehicle to alter the climate until the climate would not be too hot to the anticipated passenger before the anticipated passenger enters the interior of the vehicle;

before picking up the anticipated passenger, if the climate is determined to be too cold, then controlling the one or more systems of the vehicle to alter the climate until the climate would not be too cold to the anticipated passenger before the anticipated passenger enters the interior of the vehicle; and picking up the anticipated passenger after the climate would neither be too hot nor too cold to the anticipated passenger.

18. The method of claim 17, wherein, analyzing the data from the electronic device to estimate the metabolic heat production of the anticipated passenger includes analyzing one or more of accelerometer data, location data and time data, from which a walking or running speed of the anticipated passenger can be determined, and heartrate data;

wherein, analyzing both the data from the electronic device and the data from the vehicle to estimate the heat that the anticipated passenger lose if the anticipated passenger were in the interior of the vehicle and subject to the climate includes analyzing blower level data, from which relative air velocity can be estimated, interior air temperature data, and interior relative humidity data;

wherein, controlling the one or more systems of the vehicle to alter the climate until the climate would not be too hot to the anticipated passenger before the anticipated passenger enters the interior of the vehicle includes activating an air conditioner to lower a temperature of air of the interior and increasing a level of a blower to increase the relative air velocity in the interior of the vehicle; and wherein, controlling the one or more systems of the vehicle to alter the climate until the climate would not be too cold to the anticipated passenger before the anticipated passenger enters the interior of the vehicle includes activating a heater to increase the temperature of the air of the interior and decreasing the level of the blower to decrease the relative air velocity in the interior of the vehicle.

19. The method of claim 17 further comprising:

wherein, analyzing both the data from the electronic device and the data from the vehicle to estimate heat that the anticipated passenger would be losing if the anticipated passenger were in the interior of the vehicle and subject to the climate includes analyzing:

data from the vehicle concerning a temperature of air of the exterior and a temperature of air of the interior to estimate a mean radiant temperature of the interior of the vehicle that is between the temperature of the air of interior and the temperature of the air of the exterior; and one or more of (a) image data from the electronic device to estimate thermal insulation of clothing that the anticipated passenger is wearing, (b) location as a function of time data from the electronic device to determine the temperature of the air of the exterior at a location the anticipated passenger was at during a specific time, and assigning the thermal insulation of clothing as a function of the temperature of the air of the exterior at that location and specific time, and (c) input data from the electronic device that the anticipated passenger inputted concerning the clothing that the anticipated passenger is wearing, from which the thermal insulation of the clothing is estimated.

20. A method of controlling a vehicle interior climate comprising:

before an anticipated passenger enters a vehicle, and using data collected from an external electronic device and the vehicle,
estimating metabolic heat production of the anticipated passenger;
estimating heat that the anticipated passenger would lose while inside the vehicle;
and
controlling (a) climate system(s) of the vehicle so that the estimated metabolic heat production balances the estimated heat that the anticipated passenger would lose; and picking up the anticipated passenger after the estimated metabolic heat production balances the estimated heat that the anticipated passenger would lose.

* * * * *

UNITED STATES PATENT AND TRADEMARK OFFICE
CERTIFICATE OF CORRECTION

PATENT NO. : 10,836,234 B2  
APPLICATION NO. : 16/193586  
DATED : November 17, 2020  
INVENTOR(S) : Patil et al.

Page 1 of 1

It is certified that error appears in the above-identified patent and that said Letters Patent is hereby corrected as shown below:

In the Claims

Column 24;  
Claim 8, Line 28:  
"part from," should be --part, from--.  
Claim 9, Line 34:  
"part from," should be --part, from--.  
Claim 9, Line 35:  
Delete "the".  
Claim 10, Line 40:  
"part from," should be --part, from--.  
Claim 12, Line 55:  
"part from," should be --part, from--.  
Column 25;  
Claim 18, Line 60:  
After "passenger" insert --would--.  
Column 26;  
Claim 19, Line 22:  
After "estimate" insert --the--.  
Claim 19, Line 23:  
"be losing" should be --lose--.

Signed and Sealed this  
Nineteenth Day of January, 2021

Andrei Iancu  
*Director of the United States Patent and Trademark Office*